(12) United States Patent
Shimasaki et al.

(10) Patent No.: US 10,681,291 B2
(45) Date of Patent: *Jun. 9, 2020

(54) IMAGING DEVICE INCLUDING PHOTOELECTRIC CONVERTER

(71) Applicant: PANASONIC INTELLECTUAL PROPERTY MANAGEMENT CO., LTD., Osaka (JP)

(72) Inventors: Naoki Shimasaki, Osaka (JP); Masashi Murakami, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/383,013

(22) Filed: Apr. 12, 2019

(65) Prior Publication Data

US 2019/0238769 A1 Aug. 1, 2019

Related U.S. Application Data

(63) Continuation of application No. 15/164,910, filed on May 26, 2016, now Pat. No. 10,306,167.

(30) Foreign Application Priority Data

Jun. 8, 2015 (JP) .................................. 2015-116062

(51) Int. Cl.
*H04N 5/363* (2011.01)
*H04N 5/378* (2011.01)
*H04N 5/3745* (2011.01)

(52) U.S. Cl.
CPC ............. *H04N 5/363* (2013.01); *H04N 5/378* (2013.01); *H04N 5/37455* (2013.01); *H04N 5/37457* (2013.01)

(58) Field of Classification Search
CPC ............... H04N 5/363; H04N 5/37455; H04N 5/37457; H04N 5/378
See application file for complete search history.

(56) References Cited

U.S. PATENT DOCUMENTS 7,075,049 B2   7/2006   Rhodes et al.
8,772,727 B2   7/2014   Ruetten et al.
(Continued)

FOREIGN PATENT DOCUMENTS

JP   2007-235835 A   9/2007
JP   2007-335681 A   12/2007
(Continued)

OTHER PUBLICATIONS

Non-final Office Action issued in U.S. Appl. No. 15/164,940, dated Sep. 25, 2017.
(Continued)

Primary Examiner — Twyler L Haskins
Assistant Examiner — Fayez Bhuiyan

(57) ABSTRACT

An imaging device includes a photoelectric converter that generates signal charge; a charge storage node that stores the signal charge; a capacitive element connected to the charge storage node; and a first transistor connected to the charge storage node via the capacitive element, wherein switching between on-state and off-state of the first transistor causes an amount of saturated charge in the charge storage node to change.

21 Claims, 20 Drawing Sheets

(56) References Cited

U.S. PATENT DOCUMENTS

| | | |
|---|---|---|
| 2007/0131991 A1 | 6/2007 | Sugawa |
| 2007/0290238 A1 | 12/2007 | Adachi |
| 2009/0237539 A1 | 9/2009 | Watanabe et al. |
| 2011/0240868 A1 | 10/2011 | Ruetten et al. |
| 2013/0011955 A1 | 1/2013 | Kawabata |
| 2013/0341491 A1 | 12/2013 | Hirose et al. |
| 2014/0043510 A1 | 2/2014 | Kasuga et al. |
| 2014/0333815 A1* | 11/2014 | Iwane .................... H04N 5/378 348/308 |

FOREIGN PATENT DOCUMENTS

| | | |
|---|---|---|
| JP | 2008-022259 A | 1/2008 |
| JP | 2011-228621 A | 11/2011 |
| JP | 2013-021014 A | 1/2013 |
| WO | 2005/083790 A1 | 9/2005 |
| WO | 2011/125677 A1 | 10/2011 |
| WO | 2012/117670 A1 | 9/2012 |
| WO | 2012/147302 A1 | 11/2012 |

OTHER PUBLICATIONS

Final Office Action issued in U.S. Appl. No. 15/164,940, dated May 17, 2018.
Notice of Allowance issued in U.S. Appl. No. 15/164,940, dated Jan. 14, 2019.

\* cited by examiner

IMAGING DEVICE INCLUDING PHOTOELECTRIC CONVERTER

CROSS-REFERENCE OF RELATED APPLICATIONS

This application is a Continuation of U.S. patent application Ser. No. 15/164,910, filed on May 26, 2016, which in turn claims the benefit of Japanese Application No. 2015-116062, filed on Jun. 8, 2015, the entire disclosures of which Applications are incorporated by reference herein.

BACKGROUND

1. Technical Field

The present disclosure relates to an imaging device including a photoelectric converter. Further, the present disclosure relates to a signal processing circuit.

2. Description of the Related Art

Digital video cameras and digital still cameras are widely used. These cameras use CCDs (charge-coupled device) or CMOS (complementary metal-oxide semiconductor) image sensors. The CMOS image sensors are advantageous over the CCD image sensors, for example, in terms of high-speed driving and are becoming mainstream in imaging devices (e.g., imaging elements).

In the field of imaging devices, there is a demand for higher definition. An increase in the number of pixels along with higher definition leads to a reduction in area of each pixel, and by extension, to a decrease in area of a light receiver in each pixel. The decrease in area of the light receiver leads to a reduction in sensitivity. Further, the reduction in area of each pixel leads to a reduction in amount of saturated charge in each pixel.

Japanese Unexamined Patent Application Publication No. 2011-228621 proposes a stacked imaging element. In the stacked imaging element disclosed in Japanese Unexamined Patent Application Publication No. 2011-228621, a photoelectric conversion layer including an organic photoelectric conversion film and a pixel electrode is stacked above a circuit for reading out a signal, and the circuit for reading out a signal and the pixel electrode are electrically connected to each other via a conductive plug. In the stacked imaging element, a comparatively high sensitivity and a comparatively large amount of saturated charge are easily achieved, as a larger area can be ensured for a light receiver even with a reduction in pixel size.

In the field of imaging devices, there is also a demand for a dynamic range expansion. Japanese Patents Nos. 4467542 and 4502278 propose an imaging device having a capacitive element provided in a circuit in a pixel. In the imaging element disclosed in FIG. 1 of Japanese Patent No. 4467542 and FIG. 1 of Japanese Patent No. 4502278, the amount of saturated charge is increased by connecting the capacitive element to a floating diffusion via a transistor.

However, the imaging device is also required to suppress contamination of the floating diffusion by dark-current noise, not only to expand a dynamic range.

SUMMARY

One non-limiting and exemplary embodiment provides the following:

In one general aspects, the techniques disclosed here feature an imaging device including: a photoelectric converter that generates signal charge; a charge storage node that stores the signal charge; a capacitive element connected to the charge storage node; and a first transistor connected to the charge storage node via the capacitive element, wherein switching between on-state and off-state of the first transistor causes an amount of saturated charge in the charge storage node to change.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
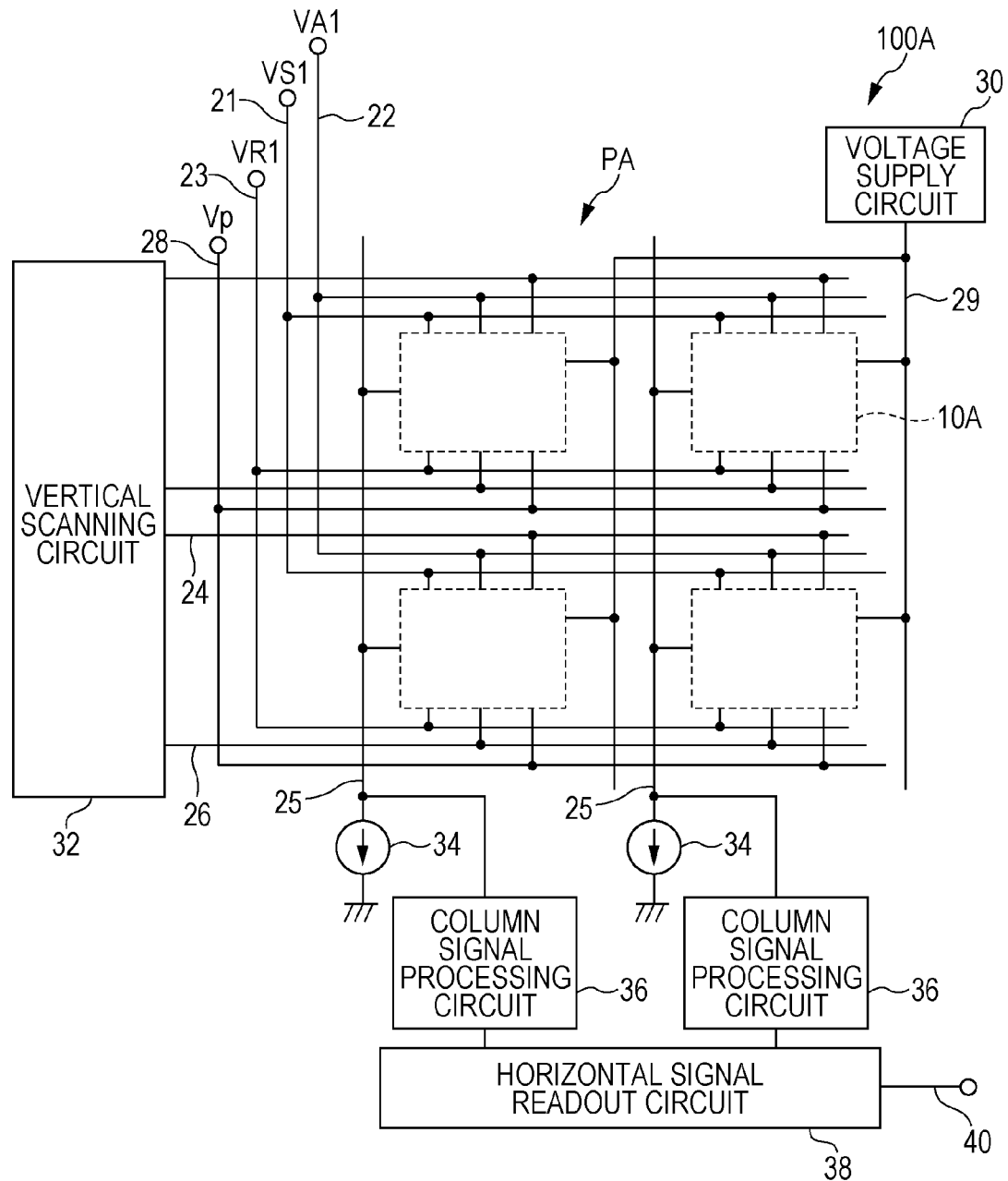
FIG. 1 is a schematic view showing an exemplary circuit configuration of an imaging device according to a first embodiment of the present disclosure.

In the configuration disclosed in FIG. 1 of Japanese Patent No. 4467542 and FIG. 1 of Japanese Patent No. 4502278, one electrode of the capacitive element is connected to a source or a drain of the transistor. For this reason, noise caused by a dark current generated at a p-n junction of the transistor is accumulated in the capacitive element. That is, the dark-current noise is superimposed on the original signal.

It is useful to expand the dynamic range while suppressing the contamination of the floating diffusion by the dark-current noise.

An embodiment of the present disclosure provides an imaging device or a signal processing circuit that can select between two modes.

Prior to a description of embodiments of the present disclosure, a summary of an aspect of the present disclosure is presented. A summary of an aspect of the present disclosure is as follows:

[Item 1]

An imaging device including:

a photoelectric converter generating a signal;

a signal detection circuit detecting the signal, the signal detection circuit including a first transistor having a first control terminal connected to the photoelectric converter, a first input terminal, and a first output terminal, a second transistor having a second control terminal connected to the photoelectric converter, a second input terminal, and a second output terminal, a third transistor having a third control terminal, a third input terminal, and a third output terminal, one of the third input terminal and the third output terminal connected to one of the second input terminal and the second output terminal;

an output signal line connected to one of the first input terminal and the first output terminal, and to the other of the third input terminal and the third output terminal; and a voltage supply circuit connected to the third control terminal, selectively supplying a first voltage or a second voltage different from the first voltage, to the third control terminal.

The configuration of Item 1 makes it possible to switch modes of the imaging device by switching voltages that are applied to the control terminal of the third transistor.

[Item 2]

The imaging device according to Item 1, wherein the other of the second input terminal and the second output terminal is connected to a power supply line to which a constant voltage is applied.

The configuration of Item 2 makes it possible to switch between a mode in which high-speed signal readout is possible and a mode in which a dynamic range expansion is possible.

[Item 3]

The imaging device according to Item 1, wherein the voltage supply circuit is connected to the other of the second input terminal and the second output terminal, and selectively supplies a third voltage or a fourth voltage to the other of the second input terminal and the second output terminal.

The configuration of Item 3 makes it possible to further expand the dynamic range.

[Item 4]

The imaging device according to any one of Items 1 to 3, further comprising a reset transistor having a fourth control terminal, a fourth input terminal, and a fourth output terminal, wherein the photoelectric converter includes a photoelectric conversion film having a first surface and a second surface opposite to the first surface, a first electrode on the first surface, and a second electrode on the second surface, the first control terminal and the second control terminal are connected to the second electrode, and one of the fourth input terminal and the fourth output terminal is connected to the second electrode.

The configuration of Item 4 makes it possible to achieve a pixel having a larger light-receiving area.

[Item 5]

The imaging device according to any one of Items 1 to 3, wherein the photoelectric converter includes a photodiode and a transfer transistor, one of an input terminal and an output terminal of the transfer transistor is connected to the photodiode, the other of the input terminal and the output terminal is connected to the first control terminal and the second control terminal, the imaging device has a reset transistor, and one of an input terminal and an output terminal of the reset transistor is connected to a node at which the control terminal of the first transistor and the second control terminal are connected to the transfer transistor.

The configuration of Item 5 makes it possible to utilize correlated double sampling (CDS) to reduce the influence of kTC noise that is generated along with a reset.

[Item 6]

The imaging device according to Item 4 or 5, further comprising a feedback circuit negatively feeding back an output signal from the first transistor through a feedback loop.

The configuration of Item 6 makes it possible to reduce the kTC noise.

[Item 7]

The imaging device according to Item 6, wherein the feedback circuit includes an inverting amplifier as a part of the feedback loop, the inverting amplifier has an inverting input terminal connected to the output signal line, and an output terminal connected to a feedback line, and the other of the fourth input terminal and the fourth output terminal is connected to the feedback line.

The configuration of Item 7 makes it possible to reduce the influence of variation in threshold value of the first transistor among pixels.

[Item 8]

The imaging device according to any one of Items 1 to 7, wherein the voltage supply circuit supplies either the first voltage or the second voltage to the third control terminal according to a luminance of a subject.

The configuration of Item 8 makes it possible to, according to a scene to be taken a picture of, set the imaging device to a mode suitable for a wide dynamic range or a mode in which high-speed signal readout is possible.

[Item 9]

A signal processing circuit including:

an input and an output;

a first transistor having a first control terminal, a first input terminal, and a first output terminal, the first control terminal being connected to the input, one of the first input terminal and the first output terminal being connected to the output;

a second transistor having a second control terminal, a second input terminal, and a second output terminal, the second control terminal being connected to the input;

a third transistor having a third control terminal, a third input terminal, and a third output terminal, one of the third input terminal and the third output terminal being connected to one of the second input terminal and the second output terminal, the other of the third input terminal and the third output terminal being connected to the output; and a voltage supply circuit that selectively supplies a first voltage or a second voltage to the third control terminal.

The configuration of Item 9 enables the signal processing circuit to switch between a mode in which it strongly exhibits a characteristic as a low-pass filter and a mode in which it is capable of high-speed signal readout.

Embodiments of the present disclosure are described in detail below with reference to the drawings. The embodiments that are described below show general or specific examples. The numerical values, shapes, materials, components, arrangements of components, forms of connection of components, steps, orders of steps that are shown in the following embodiments are merely examples, and are not intended to limit the present disclosure. Various aspects that are described herein may be combined with each other as long as no contradiction arises. Further, those of the components of the following embodiments which are not recited in the independent claim, which shows a superordinate concept, are described as optional components. In the following description, components having substantially the same functions are given common reference numerals, and a description thereof may be omitted.

First Embodiment

FIG. 1 schematically shows an exemplary circuit configuration of an imaging device according to a first embodiment of the present disclosure. An imaging device 100A shown in FIG. 1 includes a pixel array PA and a peripheral circuit. The pixel array PA includes one or more unit pixel cells. Illustrated here are four unit pixel cells 10A arranged in a two-by-two matrix. The unit pixel cells 10A form a photosensitive region (pixel region) by being for example two-dimensionally arranged on a semiconductor substrate. Needless to say, the number and arrangement of the unit pixel cells 10A shown in FIG. 1 are merely examples for illustrative purposes. The number of unit pixel cells 10A that are included in the pixel array PA is not limited to 4. The unit pixel cells 10A may be one-dimensionally arranged. In other words, the imaging device 100A may be a line sensor.

As will be described in detail below, each of the unit pixel cells 10A includes a photoelectric converter that photoelectrically converts incoming light and a signal detection circuit that detects a signal generated by the photoelectric converter. Outputs from the signal detection circuits are read out via output signal lines 25 each provided for a corresponding column of unit pixel cells 10A arranged in a matrix. As illustrated, each of the output signal lines 25 may be shared between two or more pixels.

The peripheral circuit of the imaging device 100A includes a voltage supply circuit 30, a vertical scanning circuit (also called "row scanning circuit") 32, constant current sources 34, column signal processing circuits 36 (also called "row signal accumulation circuits"), and a horizontal signal readout circuit (also called "column scanning circuit") 38. As illustrated, each of the constant current sources 34 and each of the column signal processing circuits 36 are provided for a corresponding column of unit pixel cells 10A arranged in a matrix. Each of the constant current sources 34 and each of the column signal processing circuits 36 are connected to a corresponding one of the output signal lines 25. Each of the column signal processing circuits 36 performs, for example, noise-reduction signal processing typified by correlated double sampling and analog-to-digital conversion (AD conversion). Connected to the column signal processing circuits 36 is the horizontal signal readout circuit 38. The horizontal signal readout circuit 38 sequentially reads out signals from the plurality of column signal processing circuits 36 to a horizontal common signal line 40.

Each of the unit pixel cells 10A is connected to a mode control line 29 connected to the voltage supply circuit 30. The voltage supply circuit 30 is configured, at least, to selectively supply the mode control line 29 with one of two voltages (i.e., a first voltage VB1 and a second voltage VB2) that are different in magnitude from each other. The voltage supply circuit 30 may include, for example, a converter that performs voltage conversion. The voltage supply circuit 30 may be part of the vertical scanning circuit 32.

Each of the unit pixel cells 10A is further connected to a first power supply line 21, a second power supply line 22, a reset power supply line 23, an address signal line 24, a reset control line 26, and an accumulation control line 28. The first power supply line 21 and the second power supply line 22 have connections with a power supply (not illustrated) and supply each of the unit pixel cells 10A with voltages needed for the imaging device 100A to operate. An example of a voltage VS1 that is applied to the first power supply line 21 is a power supply voltage (e.g., 3.3 V). The following describes an example in which a voltage VA1 that is applied to the second power supply line 22 is 3.3 V, which is the same as the voltage VS1. The voltage VS1 and the voltage VA1 may be the same as or different from each other.

The reset power supply line 23 has a connection with the power supply (not illustrated) and supplies each of the unit pixel cells 10A with a reference voltage VR1 during the after-mentioned reset operation. The voltage VR1 is for example 1 V or a positive voltage that is close to 1 V. The accumulation control line 28 has a connection with the power supply (not illustrated) and supplies the photoelectric converter of each of the unit pixel cells 10A with a common constant voltage Vp while the imaging device 100A is operating.

In this example, the address signal line 24 and the reset control line 26 are connected to the vertical scanning circuit 32. The vertical scanning circuit 32 selects a row of unit pixel cells 10A at a time by applying a predetermined voltage to the address signal line 24. By selecting a row of unit pixel cells 10A at a time, readout of signal voltages of the selected unit pixel cells 10A and the after-mentioned reset of pixel electrodes are executed. It should be noted that one or more of the aforementioned first power supply line 21, second power supply line 22, reset power supply line 23, and accumulation control line 28 may have a connection(s) with the vertical scanning circuit 32. Such a configuration, too, makes it possible to apply a predetermined voltage to each of the unit pixel cells 10A.

Figure 2:
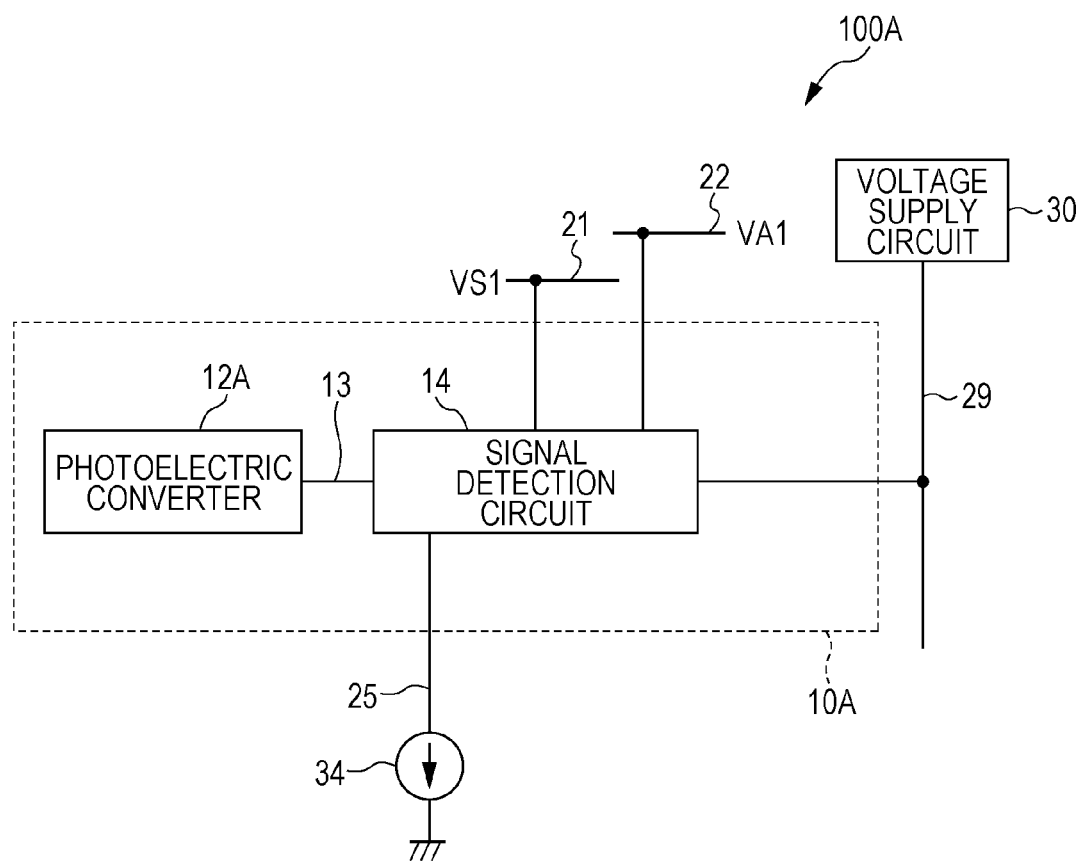
FIG. 2 is a schematic view of a circuit configuration of a unit pixel cell.

FIG. 2 schematically shows a circuit configuration of each of the unit pixel cells 10A. Each of the unit pixel cells 10A includes a photoelectric converter 12A and a signal detection circuit 14. The signal detection circuit 14 is connected to the photoelectric converter 12A via a signal-detecting node 13. The photoelectric converter 12A photoelectrically converts incoming light. The signal detection circuit 14 detects a signal generated by the photoelectric converter 12A. It should be noted that FIG. 2 omits to illustrate the vertical scanning circuit 32, the column signal processing circuits 36, and the horizontal signal readout circuit 38. The drawings that are referred to in the description that follows, too, may omit to illustrate the vertical scanning circuit 32, the column signal processing circuits 36, and the horizontal signal readout circuit 38.

Figure 3:
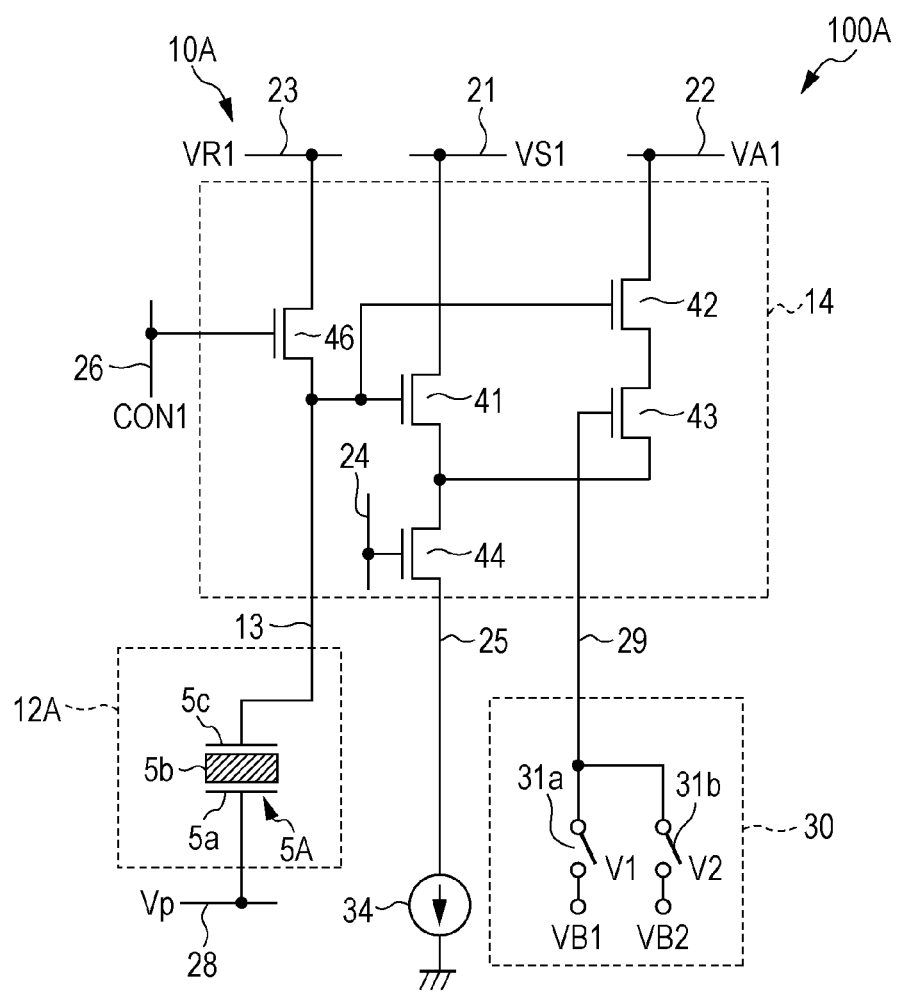
FIG. 3 is a diagram showing an example of a configuration of a photoelectric converter and a signal detection circuit.

FIG. 3 shows an example of a configuration of the photoelectric converter 12A and the signal detection circuit 14. In the configuration exemplified in FIG. 3, the photoelectric converter 12A includes a photoelectric conversion element 5A that includes a first electrode (counter electrode) 5a, a photoelectric conversion film 5b, and a second electrode (pixel electrode) 5c. As schematically shown in FIG. 3, the photoelectric conversion film 5b is placed between the first electrode 5a and the second electrode 5c. The photoelectric conversion film 5b is made of an organic material or an inorganic material such as amorphous silicon.

In the imaging device 100A, light enters from the first electrode 5a toward the photoelectric conversion film 5b. That is, the first electrode 5a is placed on a light-receiving surface side of the photoelectric conversion film 5b. The first electrode 5a is made of a transparent conducting material such as ITO. The second electrode 5c is placed on a side of the photoelectric conversion film 5b opposite to the first electrode 5a. The second electrode 5c is made of a metal such as aluminum or copper or of polysilicon given conductive properties by being doped with impurities. The second electrode 5c is typically provided for each unit pixel cell 10A. That is, the second electrode 5c in one unit pixel cell 10A is typically electrically separated from the second electrode 5c of another unit pixel cell 10A adjacent to that unit pixel cell 10A. Meanwhile, the first electrode 5a and the photoelectric conversion film 5b are typically formed across two or more unit pixel cells 10A.

The first electrode 5a is connected to the accumulation control line 28, and the second electrode 5c is connected to the signal-detecting node 13. By controlling a potential of the first electrode 5a via the accumulation control line 28, either the holes or electrons of hole-electron pairs generated by photoelectric conversion can be collected by the second electrode 5c. In a case where the holes are utilized as signal charge, it is only necessary to make the first electrode 5a higher in potential than the second electrode 5c. Of course, it is also possible to utilize the electrons as signal charge. The following describes an example in which the holes are utilized as signal charge.

For example, a voltage of approximately 10 V is applied as the voltage Vp to the first electrode 5a via the accumulation control line 28. This makes it possible to store signal charge in the signal-detecting node 13, which constitutes at least part of the floating diffusion. It should be noted that voltages that are applied to the respective unit pixel cells 10A via the accumulation control line 28 may be common to all of the unit pixel cells 10A or may vary from one pixel block of several unit pixel cells 10A to another. The supply of different voltages to different pixel blocks via the accumulation control line 28 makes it possible to vary sensitivity from one pixel to another.

As will be described in detail below, the signal detection circuit 14 includes a plurality of transistors. These transistors are typically field-effect transistors (FETs) formed on the semiconductor substrate. Unless otherwise noted, the following describes an example in which the transistors are N-channel MOS transistors. The term "semiconductor substrate" as used herein is not limited to a substrate made entirely of a semiconductor but may refer, for example, to an insulating substrate having a semiconductor layer provided on a surface thereof on which the photosensitive region is formed. An example of the semiconductor substrate is a p-type silicon substrate. A substrate potential during operation of the imaging device is for example 0 V.

The photoelectric conversion element 5A is supported by the semiconductor substrate. Typically, an interlayer insulating layer covers the transistors formed on the semiconductor substrate. The photoelectric conversion element 5A is placed on the interlayer insulating layer. The interlayer insulating layer includes, for example, a wiring layer and a plug that connect the second electrode 5c of the photoelectric conversion element 5A to the signal detection circuit 14. The wiring layer and plug of the interlayer insulating layer are typically made of metal and constitute at least part of the signal-detecting node 13.

The following describes a configuration of the signal detection circuit 14 in detail.

As shown in FIG. 3, the signal detection circuit 14 includes a first transistor 41, a second transistor 42, and a third transistor 43. Note here that the first transistor 41, the second transistor 42, and the third transistor 43 are formed on the semiconductor substrate. Each of the first transistor 41, the second transistor 42, and the third transistor 43 has a control terminal (here, a gate), an input terminal, and an output terminal. In this example, the signal detection circuit 14 further includes an address transistor 44 and a reset transistor 46. The address transistor 44 and the reset transistor 46 are also formed on the semiconductor substrate. Each of the address transistor 44 and the reset transistor 46 also has a control terminal, an input terminal, and an output terminal. The reset transistor 46 may be provided for each unit pixel cell 10A or may be shared by two or more unit pixel cells 10A.

In the configuration exemplified in FIG. 3, one of the input terminal and output terminal (here, one of a source and a drain) of the reset transistor 46 is connected to the reset power supply line 23. The other of the input terminal and output terminal of the reset transistor 46 is electrically connected to the second electrode 5c of the photoelectric conversion element 5A by being connected to the signal-detecting node 13.

As illustrated, the control terminal (here, the gate) of the first transistor 41 is connected to an output of the photoelectric converter 12A. That is, the control terminal of the first transistor 41 is connected to the signal-detecting node 13. One of the input terminal and output terminal (here, the source) of the first transistor 41 is connected to the output signal line 25 and the constant current source 34 via the address transistor 44, and the other of the input terminal and output terminal (here, the drain) of the first transistor 41 is connected to the first power supply line 21.

The address signal line 24 is connected to the control terminal (here, a gate) of the address transistor 44. A state of the address transistor 44 is determined by a potential of the address signal line 24. When the potential of the address signal line 24 is at a high level, the address transistor 44 is turned on. This causes a source follower circuit to be formed by the address transistor 44, the first transistor 41, and the constant current source 34, so that a signal corresponding to the charge stored in the signal-detecting node 13 is outputted to the output signal line 25. That is, the first transistor 41 amplifies a signal generated by the photoelectric converter 12A. When the potential of the address signal line 24 is at a low level, the address transistor 44 is turned off. This causes the first transistor 41 and the output signal line 25 to become electrically separated.

As with the control terminal of the first transistor 41, the control terminal (here, a gate) of the second transistor 42 is connected to the output of the photoelectric converter 12A. That is, the control terminal of the second transistor 42 is also connected to the signal-detecting node 13. One of the input terminal and output terminal (here, a source) of the second transistor 42 is connected to a node between the first transistor 41 and the address transistor 44 via the third transistor 43. In other words, one of the input terminal and output terminal of the second transistor 42 is connected to the output signal line 25 and the constant current source 34 via the third transistor 43 and the address transistor 44. The other of the input terminal and output terminal (here, a drain) of the second transistor 42 is connected to the second power supply line 22. In this example, during operation of the imaging device, a constant voltage (here, 3.3 V) is supplied to the other of the input terminal and output terminal of the second transistor 42 via the second power supply line 22.

The third transistor 43 is connected between the second transistor 42 and the address transistor 44. More specifically, one of the input terminal and output terminal (here, a drain) of the third transistor 43 is connected to that one of the input terminal and output terminal (here, the source) of the second transistor 42 which is not connected to the second power supply line 22. The other of the input terminal and output terminal (here, a source) of the third transistor 43 is connected to the node between the first transistor 41 and the address transistor 44. That is, one of the input terminal and output terminal of the third transistor 43, the one being not connected to the second transistor 42, is connected to the output signal line 25 via the address transistor 44. The control terminal (here, a gate) of the third transistor 43 is connected to the mode control line 29. That is, the control terminal of the third transistor 43 has an electrical connection with the voltage supply circuit 30.

In the configuration exemplified in FIG. 3, the voltage supply circuit 30 includes a voltage switching circuit, and the voltage switching circuit includes a first switch 31a and a second switch 31b. The first switch 31a is connected between the gate of the third transistor 43 and a voltage source that supplies the first voltage VB1, and the second switch 31b is connected between the gate of the third transistor 43 and a voltage source that supplies the second voltage VB2. Switching on and off each of the first and second switches 31a and 31b makes it possible to establish a connection between the voltage source that supplies the first voltage VB1 and the mode control line 29 or establish a connection between the voltage source that supplies the second voltage VB2 and the mode control line 29.

The first switch 31a and the second switch 31b are typically FETs. A control voltage V1 for switching on and off the first switch 31a and a control voltage V2 for switching on and off the second switch 31b are supplied from a control device (not illustrated) including, for example, a processor. During operation of the imaging device 100A, the use of the control voltages V1 and V2 makes it possible to selectively apply the first voltage VB1 or the second voltage VB2 to the gate of the third transistor 43. It should be noted that the voltage supply circuit 30 may be provided, for example, for each pixel.

The first voltage VB1 is lower than a threshold voltage of the third transistor 43, and the second voltage VB2 is higher than the threshold voltage of the third transistor 43. During operation of the imaging device 100A, application of the first voltage VB1 to the gate of the third transistor 43 from the voltage supply circuit 30 via the mode control line 29 causes the imaging device 100A to be set to a first mode in which the third transistor 43 is off. On the other hand, application of the second voltage VB2 to the gate of the third transistor 43 causes the imaging device 100A to be set to a second mode in which the third transistor 43 is on. Thus, in the embodiment of the present disclosure, the imaging device is set to the first mode or the second mode according to a level of a voltage that is applied to the mode control line 29.

(First Mode)

In the first mode, in which the third transistor 43 is off, one of the source and drain (here, the source) of the second transistor 42, the one being not connected to the second power supply line 22, is electrically separated from the output signal line 25. At this point in time, the second transistor 42 functions as a capacitor. The functioning of the second transistor 42 as a capacitor makes it possible to increase the amount of saturated charge without separately providing a capacitive element in the unit pixel cell 10A.

Thus, the embodiment of the present disclosure makes it possible to expand a dynamic range without separately providing a capacitive element in the unit pixel cell 10A. Therefore, the embodiment of the present disclosure is useful for achieving higher definition. Further, the elimination of the need to separately provide a large-area capacitive element in the unit pixel cell 10A allows a higher degree of freedom in element layout.

As mentioned above, in the configuration disclosed in FIG. 1 of Japanese Patent No. 4467542 and FIG. 1 of Japanese Patent No. 4502278, a capacitive element for increasing the amount of saturated charge is connected to a floating diffusion via a transistor. On the other hand, in the embodiment of the present disclosure, as exemplified in FIG. 3, the gate of the second transistor 42, which functions as a capacitor, is connected to the signal-detecting node 13, which constitutes at least part of the floating diffusion. That is, in the embodiment of the present disclosure, no p-n junction is interposed between the second transistor 42, which functions as a capacitor, and the photoelectric converter 12A. This makes it possible to expand the dynamic range while suppressing the accumulation of dark-current noise caused by a p-n junction.

(Second Mode)

On the other hand, in the second mode, in which the third transistor 43 is off, one of the source and drain (here, the source) of the second transistor 42, the one being not connected to the second power supply line 22, is electrically connected to the output signal line 25 while the address transistor 44 is on. This causes a source follower circuit to be formed by the address transistor 44, the second transistor 42, and the constant current source 34. Therefore, the second transistor 42 functions as an amplification transistor that amplifies a signal generated by the photoelectric converter 12A.

At this point in time, one of the source and drain (here, the source) of the first transistor 41, the one being not connected to the first power supply line 21, is also connected to the output signal line 25. Therefore, the first transistor 41 also functions as an amplification transistor that amplifies a signal generated by the photoelectric converter 12A. That is, in the second mode, the signal corresponding to the charge stored in the signal-detecting node 13 is read out to the output signal line 25 in parallel by the first transistor 41 and the second transistor 42.

Thus, in the second mode, in which the first transistor 41 and the second transistor 42 function as amplification transistors, driving performance is higher than it is when signals are read out with a signal amplification transistor. This makes it possible to read out signals at a higher speed than to read out signals with a single amplification transistor. It should be noted that the first transistor 41 and the second transistor 42 do not need to be completely identical in characteristic to each other. Signal readout in parallel is possible as long as the first transistor 41 and the second transistor 42 are more or less equal at least in threshold value to each other.

For example, in the case of a dark scene during picture taking, no large amount of saturated charge is needed. For this reason, in a configuration in which a capacitive element for increasing the amount of saturated charge is connected to a floating diffusion as shown in FIG. 1 of Japanese Patent No. 4467542 and FIG. 1 of Japanese Patent No. 4502278, a region in the unit pixel cell that is occupied by the capacitive element may not be able to be effectively utilized. On the other hand, in the embodiment of the present disclosure, selection of the second mode in the case of a dark scene during picture taking allows the second transistor 42 to function as an amplification transistor. That is, the second transistor 42 can execute an appropriate operation for the scene during picture taking, by switching between the functions according to the scene. Thus, the embodiment of the present disclosure makes it possible to effectively utilize the second transistor 42 in both the first mode and the second mode. Therefore, the embodiment of the present disclosure is also useful in achieving higher definition.

It should be noted that when the second transistor 42 is deemed as a capacitor, the capacitance Cg is expressed by the sum of the capacitance $C_{GS}$ between the gate and the source, the capacitance $C_{GD}$ between the gate and the drain, and the capacitance $C_{GB}$ between the gate and the substrate. That is, $Cg=C_{GS}+C_{GD}+C_{GB}$.

In the first mode, the capacitance $C_{GS}$ is substantially 0, as the source is floating. The capacitance $C_{GD}$ is an overlap capacitance between the gate and the drain. In the first mode, the second transistor 42 may operate in a cutoff region. That is, in the first mode, a serial connection of a gate insulating layer capacitance and a depletion layer capacitance is formed between the gate and the substrate. Therefore, the capacitance $C_{GB}$ is the sum of the gate insulating layer capacitance and the depletion layer capacitance.

On the other hand, in the second mode, since the second transistor 42 performs a source follower operation, the capacitance $C_{GS}$ between the gate and the source is substantially 0, as in the first mode. Further, as in the first mode, since an overlap capacitor is formed between the gate and the drain, the capacitance $C_{GD}$ between the gate and the drain is also the same as that in the first mode. However, in the second mode, in which the second transistor 42 performs a source follower operation, the capacitance $C_{GB}$ between the gate and the substrate is 0. For this reason, when the second transistor 42 is deemed as a capacitor, the capacitance Cg is higher in the first mode than in the second mode.

Figure 4:
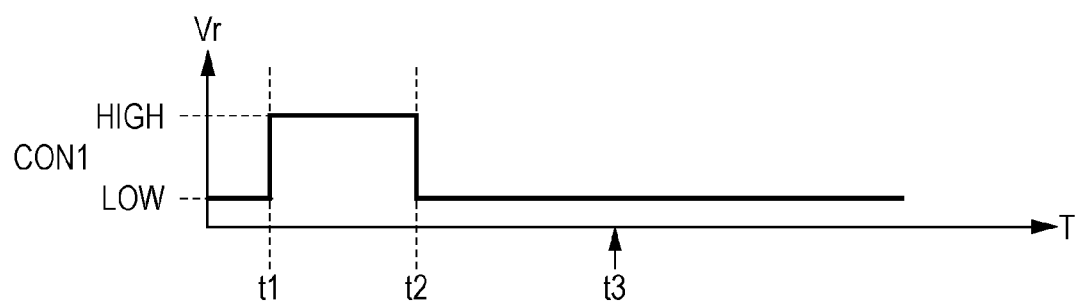
FIG. 4 is a timing chart showing an example of a voltage level of a reset control line.

Next, an exemplary operation of the imaging device 100A is described with reference to FIG. 4. FIG. 4 is a timing chart showing an example of a voltage level of the reset control line 26. In FIG. 4, the horizontal axis represents time T, and the vertical axis represents a gate voltage Vr of the reset transistor 46.

First, at a time T=t1, a potential CON1 of the reset control line 26 is brought to a high level. Bringing the potential CON1 of the reset control line 26 to a high level brings the reset transistor 46 to an on-state, so that a potential of the signal-detecting node 13 is reset to the reference voltage VR1. At the time of reset, the reference voltage VR1 may be set to any voltage that ranges between the power supply voltage (e.g., 3.3 V) and the ground (0 V). In other words, any voltage (e.g., a voltage other than the power supply voltage) may be used as the reference voltage at the time of reset, provided such a voltage falls within a certain range.

Next, at a time t2, the potential CON1 of the reset control line 26 is brought to a low level. Bringing the potential CON1 of the reset control line 26 to a low level brings the reset transistor 46 to an off-state. After that, the address transistor 44 is brought to an off-state, and exposure is started. Signal charge generated by the photoelectric converter 12A is stored in the floating diffusion. The floating diffusion includes the signal-detecting node 13 as part thereof.

After passage of a predetermined period of time, the address transistor 44 is brought to an on-state (time t3), and a voltage level of the signal-detecting node 13 is read out via the output signal line 25. At this point in time, when the first switch 31a is on and the second switch 31b is off, the first voltage VB1 is applied to the gate of the third transistor 43 via the mode control line 29. Therefore, the imaging device 100A is in the first mode, in which the third transistor 43 is off. In the first mode, the first transistor 41 functions as a source follower circuit, whereby the voltage level of the signal-detecting node 13 is read out to the output signal line 25.

In the first mode, the second transistor 42 functions as a capacitor instead of performing a source follower operation. For this reason, the capacitance of the floating diffusion is higher in the first mode than in the second mode, in which the third transistor 43 is on. That is, in the first mode, such an operation is executed that the capacitance of the floating diffusion becomes higher than it is in the second mode. A voltage level corresponding to the stored signal charge is read out via the first transistor 41.

On the other hand, when the first switch 31a is off and the second switch 31b is on, the second voltage VB2 is applied to the gate of the third transistor 43 via the mode control line 29. Therefore, the imaging device 100A is in the second mode, in which the third transistor 43 is on. In the second mode, the first transistor 41 and the second transistor 42 function as source follower circuits, and the signal level corresponding to the stored signal charge is read out via the first transistor 41 and the second transistor 42. Therefore, signal readout is performed at a higher speed than it is in the first mode.

After that, the potential CON1 of the reset control line 26 is brought to a high level at a predetermined timing, and the potential of the signal-detecting node 13 is reset. Further, the voltage level of the signal-detecting node 13 is read out via the output signal line 25 by bringing the address transistor 44 to an on-state. By taking the difference between the voltage level obtained at this time and the voltage level obtained at the time t3, a signal from which fixed noise has been eliminated is obtained.

Modification of the First Embodiment

Figure 5:
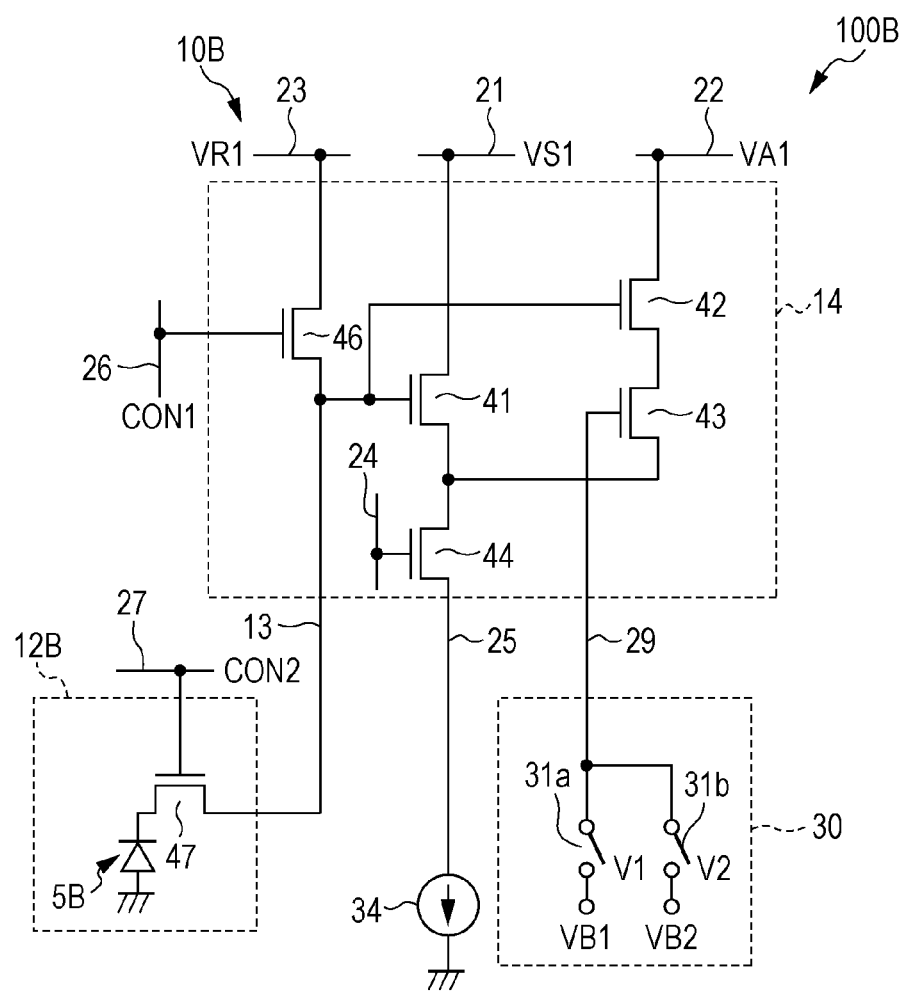
FIG. 5 is a diagram showing a configuration of a unit pixel cell including a photoelectric converter.

A configuration of a unit pixel cell according to the embodiment of the present disclosure is not limited to the example described with reference to FIG. 3. FIG. 5 shows another example of an imaging device according to the first embodiment of the present disclosure. A point of difference between a unit pixel cell 10B of an imaging device 100B shown in FIG. 5 and the unit pixel cell 10A described with reference to FIG. 3 is that instead of including a photoelectric converter 12A, the unit pixel cell 10B includes a photoelectric converter 12B including a photodiode 5B. Thus, in the embodiment of the present disclosure, a photodiode may be used as a photoelectric conversion element.

In the configuration exemplified in FIG. 5, the photoelectric converter 12B includes a transfer transistor 47. The transfer transistor 47 is connected between the photodiode 5B and the signal-detecting node 13. That is, one of an input terminal and an output terminal (here, a one of a source and a drain) of the transfer transistor 47 has a connection with the photodiode 5B, and the other of the input terminal and output terminal of the transfer transistor 47 has connections with the gate of the first transistor 41 and the gate of the second transistor 42. Connected to a control terminal (here, a gate) of the transfer transistor 47 is a transfer control line 27. The transfer control line 27 is connected, for example, to the vertical scanning circuit 32 (see FIG. 1). The turning on and turning off of the transfer transistor 47 is controlled by the vertical scanning circuit 32 controlling a potential CON2 of the transfer control line 27. As with the first transistor 41, the second transistor 42, and the third transistor 43, the transfer transistor 47 is typically formed on the semiconductor substrate.

As mentioned above, the signal detection circuit 14 includes the reset transistor 46. One of the source and drain of the reset transistor 46, the one being not connected to the reset power supply line 23, is connected to the signal-detecting node 13. That is, in this example, one of the source and drain of the reset transistor 46, the one being not connected to the reset power supply line 23, is connected to a node that connects the gate of the first transistor 41 and the gate of the second transistor 42, to the transfer transistor 47. The reset transistor 46 may be shared between two or more unit pixel cells 10B.

Figure 6:
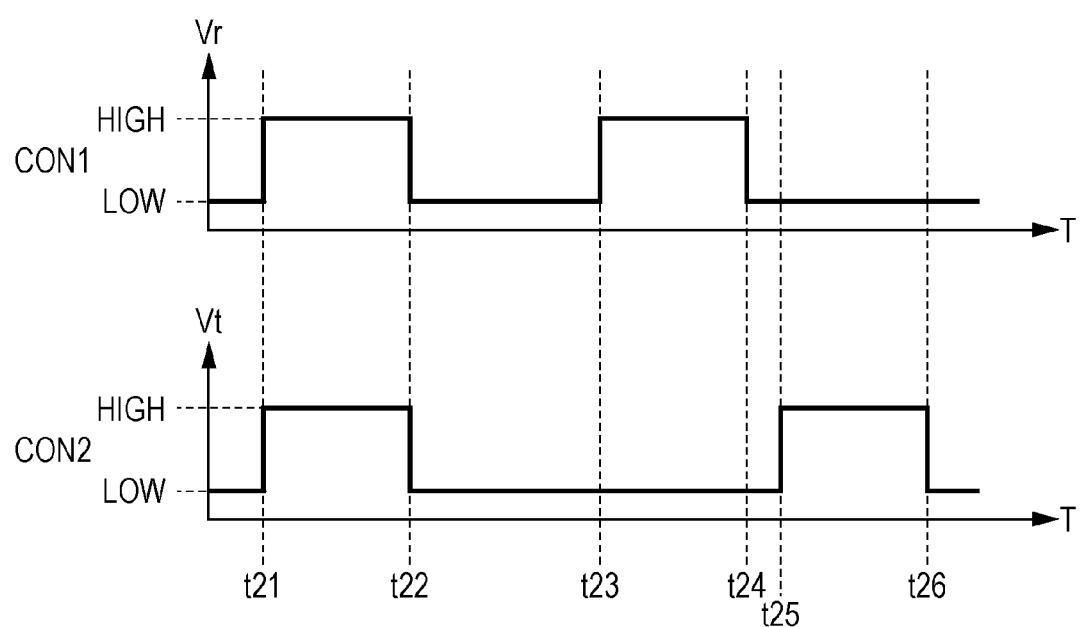
FIG. 6 is a timing chart showing examples of voltage levels of a reset control line and a transfer control line.

An exemplary operation of the imaging device including the unit pixel cells 10B is described with reference to FIG. 6. FIG. 6 is a timing chart showing examples of voltage levels of the reset control line 26 and the transfer control line 27. In the graph on the lower side of FIG. 6, the vertical axis represents a gate voltage Vt of the transfer transistor 47. It should be noted that when the first switch 31a is on and the second switch 31b is off, the imaging device 100B operates in the first mode, in which the third transistor 43 is off. When the first switch 31a is off and the second switch 31b is on, the imaging device 100B operates in the second mode, in which the third transistor 43 is on.

First, at a time t21, the reset transistor 46 and the transfer transistor 47 are turned on by bringing the potential CON1 of the reset control line 26 and the potential CON2 of the transfer control line 27 to high levels, with the address transistor 44 in an off-state. The turning on of the reset transistor 46 and the transfer transistor 47 causes charge to be transferred from the photodiode 5B and the signal-detecting node 13, so that the photodiode 5B and the signal-detecting node 13 are reset.

Next, at a time t22, the reset transistor 46 and the transfer transistor 47 are turned off by bringing the potential CON1 of the reset control line 26 and the potential CON2 of the transfer control line 27 to low levels. After that, exposure is executed in a period from a time t22 to a time t23.

Next, at the time t23, the reset transistor 46 is turned on by bringing the potential CON1 of the reset control line 26 to a high level, so that the potential of the signal-detecting node 13 is reset to the reference voltage VR1.

Next, at a time t24, the reset transistor 46 is turned off by bringing the potential CON1 of the reset control line 26 to a low level. Furthermore, the address transistor 44 is brought into an on-state, and the voltage level of the signal-detecting node 13 is read out via the output signal line 25.

After that, at a time t25, the transfer transistor 47 is turned on by bringing the potential CON2 of the transfer control line 27 to a high level. The turning on of the transfer transistor 47 causes signal charge generated by the photoelectric converter 12B to be transferred to the floating diffusion, which includes the signal-detecting node 13 as part thereof. At this point in time, when the imaging device 100B is in the first mode, the second transistor 42 functions as a capacitor to store at least part of the signal charge generated by the photoelectric converter 12B. After the transfer of the signal charge (time t26), the transfer transistor 47 is turned off by bringing the potential CON2 of the transfer control line 27 to a low level.

After that, a voltage level corresponding to the transferred signal charge is read out by bringing the address transistor 44 to an on-state. In the first mode, a voltage level corresponding to the signal charge stored in the floating diffusion is read out to the output signal line 25 via the first transistor 41. On the other hand, when the imaging device is in the second mode, the voltage level corresponding to the signal charge stored in the floating diffusion is read out at a higher speed via the first transistor 41 and the second transistor 42. By taking the difference between the voltage level obtained at this time and the voltage level obtained at the time t24, a signal from which kTC noise has been eliminated is obtained.

As described above, in the first embodiment, the imaging device can be set to the first mode or the second mode by switching voltages that are applied from the voltage supply circuit 30 to the gate of the third transistor 43. In the first mode, in which the third transistor 43 is off, the second transistor 42, whose gate is connected to the signal-detecting node 13, can function as a capacitor. This makes it possible to expand the dynamic range. In the embodiment of the present disclosure, no p-n junction of a transistor is interposed between the second transistor 42, which functions as a capacitor, and the signal-detecting node 13. This makes it possible to suppress the accumulation of dark-current noise in the second transistor 42 as a capacitor. In the second mode, in which the third transistor 43 is on, the first transistor 41 and the second transistor 42 function as signal-detecting transistors. This makes it possible to perform high-speed signal readout by effectively utilizing the second transistor 42.

Second Embodiment

Figure 7:
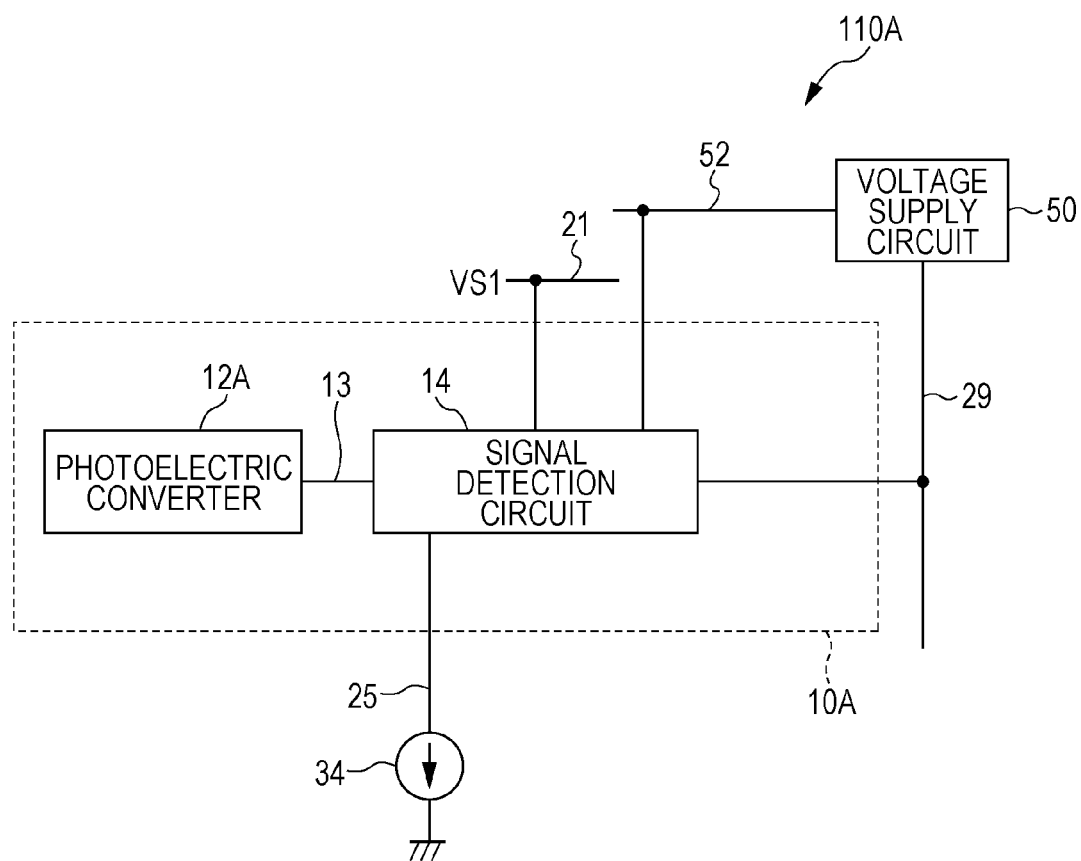
FIG. 7 shows wires between a unit pixel cell and a voltage supply circuit in an imaging device according to a second embodiment of the present disclosure.

FIG. 7 shows wires between a unit pixel cell and a voltage supply circuit in an imaging device according to a second embodiment of the present disclosure. An imaging device 110A shown in FIG. 7 includes a unit pixel cell 10A and a voltage supply circuit 50. A point of difference between the imaging device 100A described with reference to FIG. 2 and the imaging device 110A shown in FIG. 7 is that in the imaging device 110A, a second power supply line 52 having a connection with each unit pixel cell 10A is connected to the voltage supply circuit 50. As will be described below, the voltage supply circuit 50 is configured to selectively supply the second power supply line 52 with one of two voltages (i.e., a first voltage VA1 and a second voltage VA2) that are different in magnitude from each other.

Figure 8:
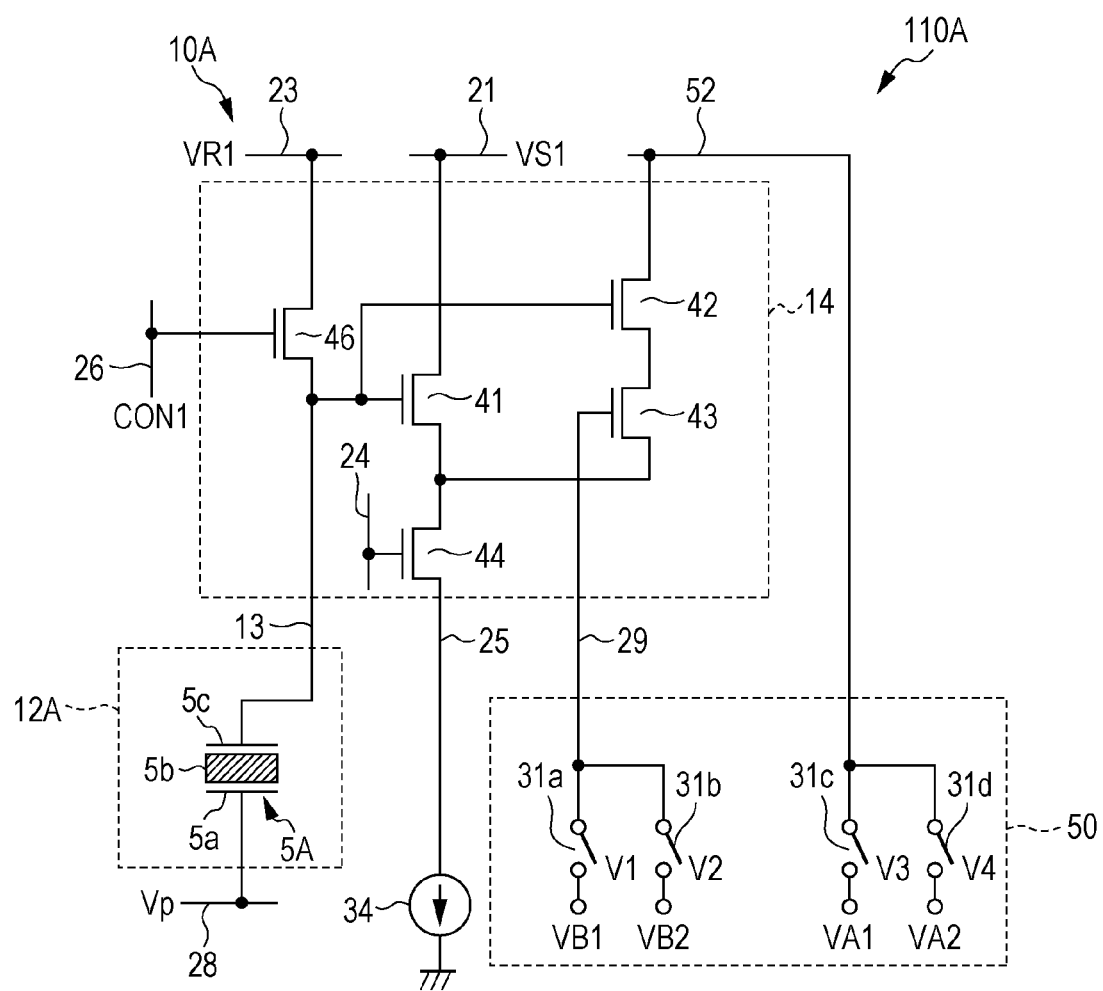
FIG. 8 is a diagram showing an example of a configuration of the voltage supply circuit in the imaging device shown in FIG. 7.

FIG. 8 shows an example of a configuration of the voltage supply circuit 50 in the imaging device 110A. In the configuration exemplified in FIG. 8, the voltage supply circuit 50 includes a first switch 31a and a second switch 31b, as with the voltage supply circuit 30 described with reference to FIG. 3. In this example, the voltage supply circuit 50 further includes a third switch 31c and a fourth switch 31d. That is, the voltage supply circuit 50 here includes a voltage switch circuit including the four switches.

The third switch 31c has one end connected to the second power supply line 52 and the other end connected to a voltage source that supplies the voltage VA1. The fourth switch 31d has one end connected to the second power supply line 52 and the other end connected to a voltage source that supplies the voltage VA2, which is lower than the voltage VA1. Therefore, switching on and off each of the third and fourth switches 31c and 31d makes it possible to establish a connection between the voltage source that supplies the first voltage VA1 and the second power supply line 52 or establish a connection between the voltage source that supplies the second voltage VA2 and the second power supply line 52. Described here is an example in which the voltage VA1 and the voltage VA2 are a power supply voltage of 3.3 V and 0 V, respectively. The voltage supply circuit 50 may include, for example, a converter that performs voltage conversion or may be part of the vertical scanning circuit 32. The voltage supply circuit 50 may be provided, for, example, for each pixel.

As illustrated, the second power supply line 52 is connected to one of the source and drain of the second transistor 42 (here, the drain of the second transistor 42), the one being not connected to the source or drain of the third transistor 43. Therefore, the voltage supply circuit 50 can selectively apply the voltage VA1 or the voltage VA2 to the drain (or source) of the second transistor 42 via the second power supply line 52.

The third switch 31c and the fourth switch 31d are typically field-effect transistors. A control voltage V3 for switching on and off the third switch 31c and a control voltage V4 for switching on and off the fourth switch 31d are supplied from a control device (not illustrated) including, for example, a processor. During operation of the imaging device 110A, the use of the control voltages V3 and V4 makes it possible to selectively apply the voltage VA1 or the voltage VA2 to the drain (or source) of the second transistor 42. That is, in the second embodiment, a potential of the second power supply line 52 is controlled by the voltage supply circuit 50.

As mentioned above, the voltage supply circuit 50 includes the first switch 31a and the second switch 31b. Therefore, the voltage supply circuit 50 can selectively apply the first voltage VB1 or the second voltage VB2 to the gate of the third transistor 43.

(First Mode)

When the voltage that is applied from the voltage supply circuit 50 to the mode control line 29 is the first voltage VB1, the imaging device 110A is set to the first mode, in which the third transistor 43 is off. In the first mode, the first transistor 41 functions as a signal-detecting transistor, and the second transistor 42 functions as a capacitor.

In the first mode, turning on the third switch 31c and turning off the fourth switch 31d causes the voltage VA1 (here, a power supply voltage of 3.3 V) to be applied to the drain of the second transistor 42 via the second power supply line 52. At this point in time, the second transistor 42 operates in the same way as it does in the first mode in the first embodiment and exhibits the same capacitance as it does in the first mode in the first embodiment.

In this example, the third switch 31c can be turned off, and the fourth switch 31d can be turned on. When the third switch 31c is off and the fourth switch 31d is on, the voltage VA2 (here, 0 V), which is lower than the voltage VA1, is applied to the drain of the second transistor 42. The turning off of the third transistor 43 and the application of the voltage VA2 to the drain of the second transistor 42 make it possible to form a channel below the gate of the second transistor 42.

In a state where the channel is formed, no depletion layer capacitor is formed between the gate and the substrate, as the channel blocks an electric field. Further, while the capacitance $C_{GS}$ is substantially 0 in the first mode in the first embodiment, overlap capacitors exist between the gate and the drain and between the gate and the source in a state where the voltage VA2 is applied to the drain of the second transistor 42.

The capacitance Cg of the second transistor 42 in the state where the voltage VA2 is applied to the drain of the second transistor 42 is the sum of the overlap capacitance between the gate and the source, the overlap capacitance between the gate and the drain, and the capacitance of the gate insulating layer. Therefore, the capacitance Cg of the second transistor 42 in the state where the voltage VA2 is applied to the drain of the second transistor 42 is higher than it is in the first mode in the first embodiment.

Thus, the second embodiment makes it possible to make the capacitance Cg of the second transistor 42 higher than it is in the first embodiment by switching voltages that are applied from the voltage supply circuit 50 to the mode control line 29. That is, the second embodiment makes it possible to further expand the dynamic range.

(Second Mode)

When the voltage that is applied from the voltage supply circuit 50 to the mode control line 29 is the second voltage VB2, the imaging device 110A is set to the second mode, in which the third transistor 43 is on. In the second mode, the voltage VA1 (here, 3.3 V) is applied from the voltage supply circuit 50 to the second power supply line 52 by turning on the third switch 31c and turning off the fourth switch 31d. At this point in time, the second transistor 42 forms a source follower circuit. Therefore, high-speed signal readout is executed via the first transistor 41 and the second transistor 42.

Operation in the imaging device 110A may be the same as the exemplary operation of the imaging device 100A described with reference to FIG. 4. Therefore, a description of operation of the imaging device 110A is omitted here.

Modification of the Second Embodiment

Figure 9:
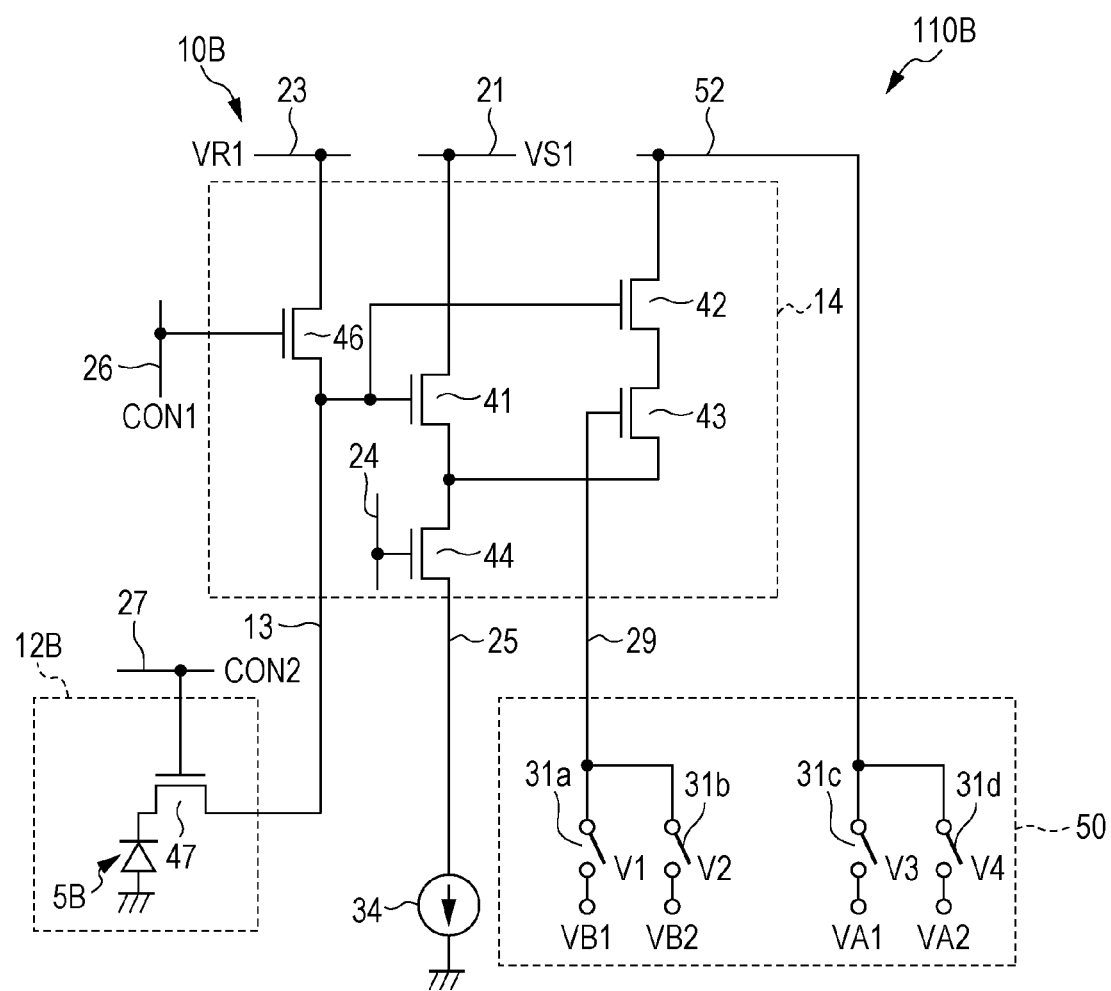
FIG. 9 is a diagram showing another example of an imaging device according to the second embodiment of the present disclosure.

FIG. 9 shows another example of an imaging device according to the second embodiment of the present disclosure. A point of difference between an imaging device 110B shown in FIG. 9 and the imaging device 110A described with reference to FIG. 8 is that instead of including a photoelectric converter 12A, the imaging device 110B includes a photoelectric converter 12B including a photodiode 5B. As shown in FIG. 9, a unit pixel cell 10B having a photoelectric converter 12B including a photodiode 5B and a voltage supply circuit 50 capable of selectively applying the voltage VA1 or the voltage VA2 to the drain (or source) of the second transistor 42 may be combined. Such a configuration makes it possible to achieve a higher capacitance as the capacitance of the second transistor 42, which functions as a capacitor in the first mode, as with the imaging device 110A described with reference to FIG. 8.

Operation in the imaging device 110B may be the same as the exemplary operation of the imaging device 100B described with reference to FIG. 6. Therefore, a description of operation of the imaging device 110B is omitted here.

Third Embodiment

Figure 10:
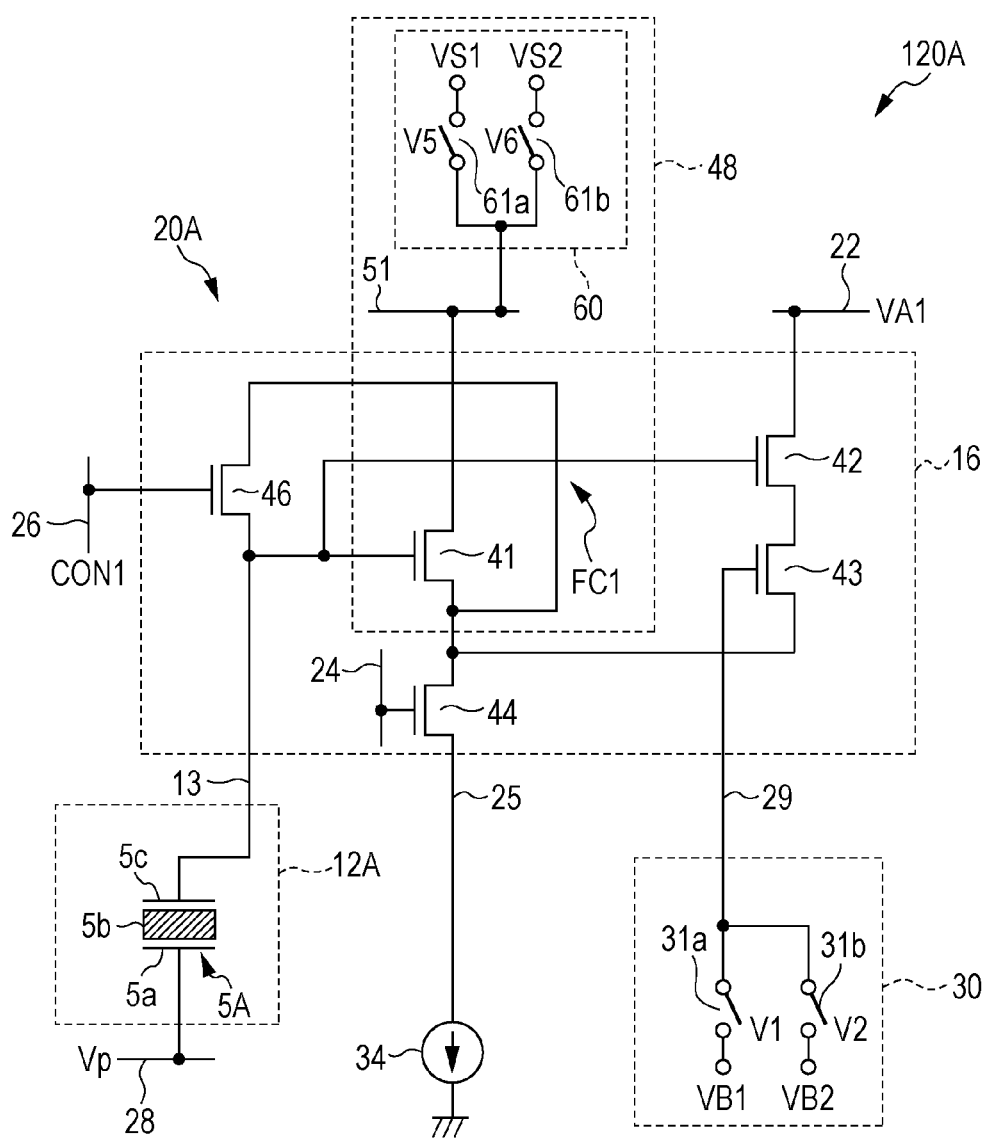
FIG. 10 is a diagram showing an example of an imaging device according to a third embodiment of the present disclosure.

FIG. 10 shows an example of an imaging device according to a third embodiment of the present disclosure. An imaging device 120A shown in FIG. 10 includes a unit pixel cell 20A. The unit pixel cell 20A includes a photoelectric converter 12A and a signal detection circuit 16.

The signal detection circuit 16 includes a feedback circuit FC1 that negatively feeds back an output from the first transistor 41. In the configuration exemplified in FIG. 10, One of the source and drain of the reset transistor 46, the one being not connected to the signal-detecting node 13, is connected to the node between the first transistor 41 and the address transistor 44. In the unit pixel cell 20A, a feedback loop that negatively feeds back an output from the first transistor 41 is formed in the signal detection circuit 16 when the reset transistor 46 is on. That is, in this example, the reset transistor 46 constitutes part of the feedback circuit FC1.

The imaging device 120A include a voltage switch circuit 60 that supplies a predetermined voltage to the first transistor 41. The voltage switch circuit 60 is connected via a first power supply line 51 to one of the source and drain (here, the drain) of the first transistor 41 in the unit pixel cell 20A, the one being not connected to the output signal line 25. In the third embodiment, the voltage switch circuit 60 and the first transistor 41 constitute an amplifier 48.

The voltage switch circuit 60 is configured to selectively supply the voltage VS1 or the voltage VS2, which is lower than the voltage VS1, to the drain (or source) of the first transistor 41. In the configuration exemplified in FIG. 10, the voltage switch circuit 60 includes a switch 61a and a switch 61b. The switch 61a is connected between the first power supply line 51 and a voltage source that supplies the voltage VS1, and the switch 61b is connected between the first power supply line 51 and a voltage source that supplies the voltage VS2. The first switch 61a and the second switch 61b are typically field-effect transistors (FETs). A control voltage V5 for switching on and off the first switch 61a and a control voltage V6 for switching on and off the second switch 61b are supplied from a vcontrol device (not illustrated) including, for example, a processor.

A typical example of signal readout in the imaging device 120A is described with reference to FIG. 11. As will be described below, in this example, a voltage that varies temporally in magnitude is applied to the gate of the reset transistor 46. This enables the reset transistor 46 to function as a band control circuit in the feedback circuit FC1.

Figure 11:
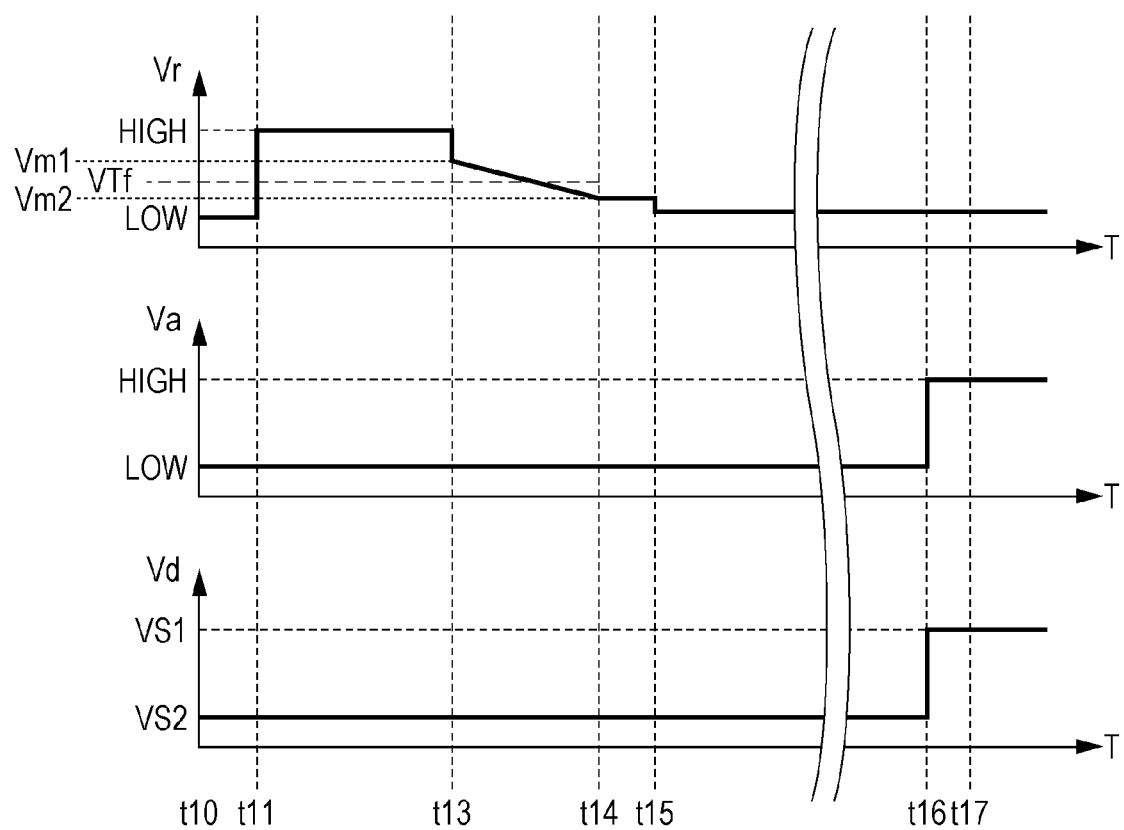
FIG. 11 is an exemplary timing chart for explaining an operation of reading out a signal with a unit pixel cell.

FIG. 11 is an exemplary timing chart for explaining an operation of reading out a signal with the unit pixel cell 20A. Starting from the top, the vertical axes of the graphs shown in FIG. 11 represent the gate voltage Vr of the reset transistor 46, a voltage level Va of the address signal line 24, and voltage level Vd of the first power supply line 51, respectively. One of the graphs shows a voltage VTf, which is a threshold voltage of the reset transistor 46. The signal readout operation described below is common to the first mode and the second mode.

First, at a time t11, the address transistor 44 is turned off by bringing the potential of the address signal line 24 to a low level. Further, the reset transistor 46 is turned on by bringing the potential CON1 of the reset control line 26 to a high level. At this point in time, the voltage VS2 (typically, GND) is applied to the drain (or source) of the first transistor 41 by turning off the switch 61a of the voltage switch circuit 60 and turning on the switch 61b of the voltage switch circuit 60. These operations cause the signal-detecting node 13 to be reset. At the time of reset, the reference voltage is an output from the first transistor 41. At this point in time, an operating band of the reset transistor 46 is a first band that is a wide band. The first band means a band that corresponds to a high-level gate potential.

Next, in a period from a time t13 to a time t14, the potential CON1 of the reset control line 26 is changed so that the reset transistor 46 gradually changes from an on-state to an off-state. That is, the potential CON1 of the reset control line 26 is changed from a high level toward a low level in such a way as to cross the threshold voltage VTf of the reset transistor 46. At this point in time, the potential CON1 is controlled so that the operating band of the reset transistor 46 becomes a second band that is narrower than the first band. Note here that at the time t13, the potential of the reset control line 26 is lowered to a potential Vm1 between the high level and the low level. Furthermore, in the period from the time t13 to the time t14, the potential of the reset control line 26 is continuously lowered to a potential Vm2. Note also here that after the potential of the reset control line 26 has been lowered to the potential Vm2, the potential of the reset control line 26 is lowered to the low level at a time t15. The potential Vm2 is lower than the potential Vm1 and higher than the low level. Of course, the potential of the reset control line 26 may be continuously changed from the high level to the low level.

In a state where the second band is lower than the operating band of the first transistor 41, thermal noise that is generated in the reset transistor 46 is made $1/(1+A)^{1/2}$ times as small by the feedback circuit FC1 when the amplifier 48 has an amplification factor of (−A). When the reset transistor 46 is turned off by bringing the potential of the reset control line 26 to the low level at the time t15 in a state where the second band is lower than the operating band of the first transistor 41, kTC noise remaining in the signal-detecting node 13 is also made $1/(1+A)^{1/2}$ times as small as it is in the absence of feedback. In this example, the reset transistor 46 not only functions as a switching element that switches between applying and not applying the reference voltage to the signal-detecting node 13 at the time of reset, but also has a function of a band limiting element that limits a transmission band of an output signal from the amplifier 48 and output the limited signal to the signal-detecting node 13.

Next, in a period from the time t15 to a time t16, exposure is executed. After the exposure, the address transistor 44 is turned on by bringing the potential of the address signal line 24 to a high level at the time t16. Further, the voltage VS1 (typically, the power supply voltage) is applied to the drain (or source) of the first transistor 41 by turning on the switch 61a of the voltage switch circuit 60 and turning off the switch 61b of the voltage switch circuit 60.

The voltage of the signal-detecting node 13 at the time t16 differs from the reference voltage at the time of reset by an electrical signal generated by the photoelectric converter 12A in the period from the time t15 to the time t16. When the imaging device 120A is, for example, in the first mode (in which the third transistor 43 is off), the first transistor 41 and the constant current source 34 form a source follower circuit, and the voltage of the signal-detecting node 13 is amplified by the amplifier 48 (for example, with an amplification factor of approximately 1) and outputted to the output signal line 25 (time t17). When the imaging device 120A is, for example, in the second mode (in which the third transistor 43 is on), signal readout is executed via the first transistor 41 and the second transistor 42.

Typically interposed between the second electrode 5c (pixel electrode) of the photoelectric conversion element 5A and the signal detection circuit 16 are, for example, a metal wiring layer and/or a metal plug that connect(s) the second electrode 5c (pixel electrode) of the photoelectric conversion element 5A to the signal detection circuit 16. Interposition of metal layers and/or metal plugs between the second electrode 5c of the photoelectric conversion element 5A and the gate of the first transistor 41 and between the second electrode 5c of the photoelectric conversion element 5A and the gate of the second transistor 42 makes it difficult to completely transfer charge collected by the pixel electrode to the floating diffusion. For this reason, in such a configuration, it is not effective to simply adopt a technique that adopts correlated double sampling by providing transfer transistors in the pixels. In the third embodiment, the influence of kTC noise is reduced by forming a feedback loop in each unit pixel cell.

It should be noted that the voltage that is applied to the gate of the reset transistor 46 may be a voltage that increases as time passes. The change in the voltage that is applied to the gate of the reset transistor 46 may be a continuous change or may, for example, be a stepwise change. It should be noted that the voltage switch circuit 60 may be provided, for example, for each pixel. The provision of the voltage switch circuit 60 for each pixel makes it possible to simultaneously form feedback loops in two or more pixels that belong to the same column in the pixel array. That is, the formation of feedback loops makes it possible to simultaneously execute noise cancellation in a larger number of pixels, thus making it possible to shorten a total period of time required for the cancellation of noise.

First Modification of the Third Embodiment

Figure 12:
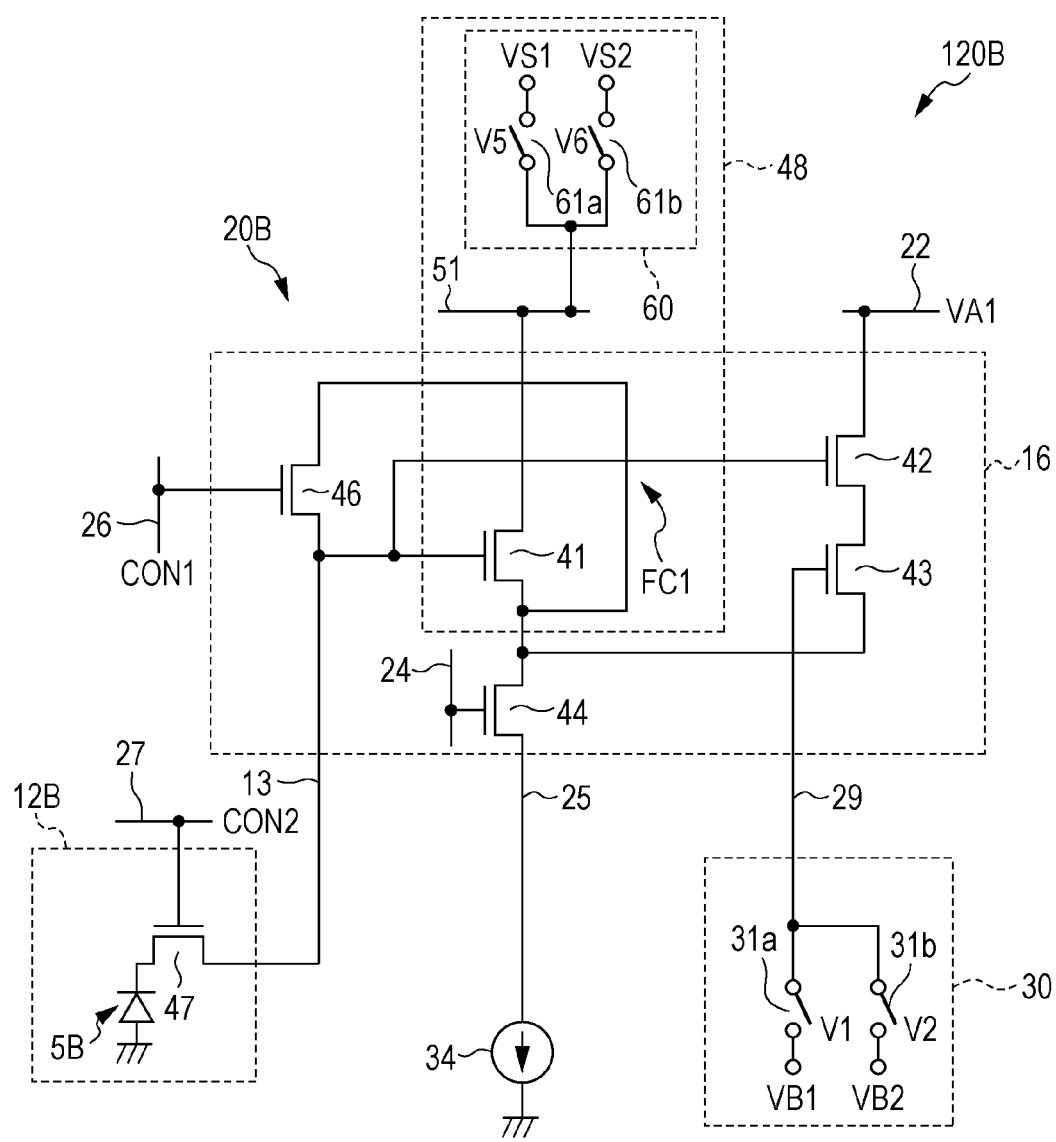
FIG. 12 is a diagram showing another example of an imaging device according to the third embodiment of the present disclosure.

FIG. 12 shows another example of an imaging device according to the third embodiment of the present disclosure. Whereas the imaging device 120A described with reference to FIG. 10 includes the unit pixel cell 20A, an imaging device 120B shown in FIG. 12 includes a unit pixel cell 20B. A point of difference between the unit pixel cell 10A of the imaging device 120A and the unit pixel cell 20B shown in FIG. 12 is that instead of including a photoelectric converter 12A, the unit pixel cell 20B includes a photoelectric converter 12B including a photodiode 5B. Such a configuration, too, makes it possible to reduce the influence of kTC noise, as with the aforementioned imaging device 120A.

Operation in the imaging device 120B may be the same as the exemplary operation of the imaging device 100B described with reference to FIG. 6. It should be noted that it is possible to omit the transfer transistor 47 from the photoelectric converter 12B. A configuration in which the transfer transistor 47 is omitted is useful for achieving higher resolution of pixels. The omission of the transfer transistor 47 makes it possible to increase the proportion of the area of the photodiode 5B to the unit pixel cell, for example in comparison with the configuration shown in FIG. 5. Operation in an imaging device configured by omitting the transfer transistor 47 from the imaging device 120B may be the same as that of the imaging device 120A shown in FIG. 10. Therefore, a description of operation of the imaging device 120B is omitted here.

Second Modification of the Third Embodiment

Figure 13:
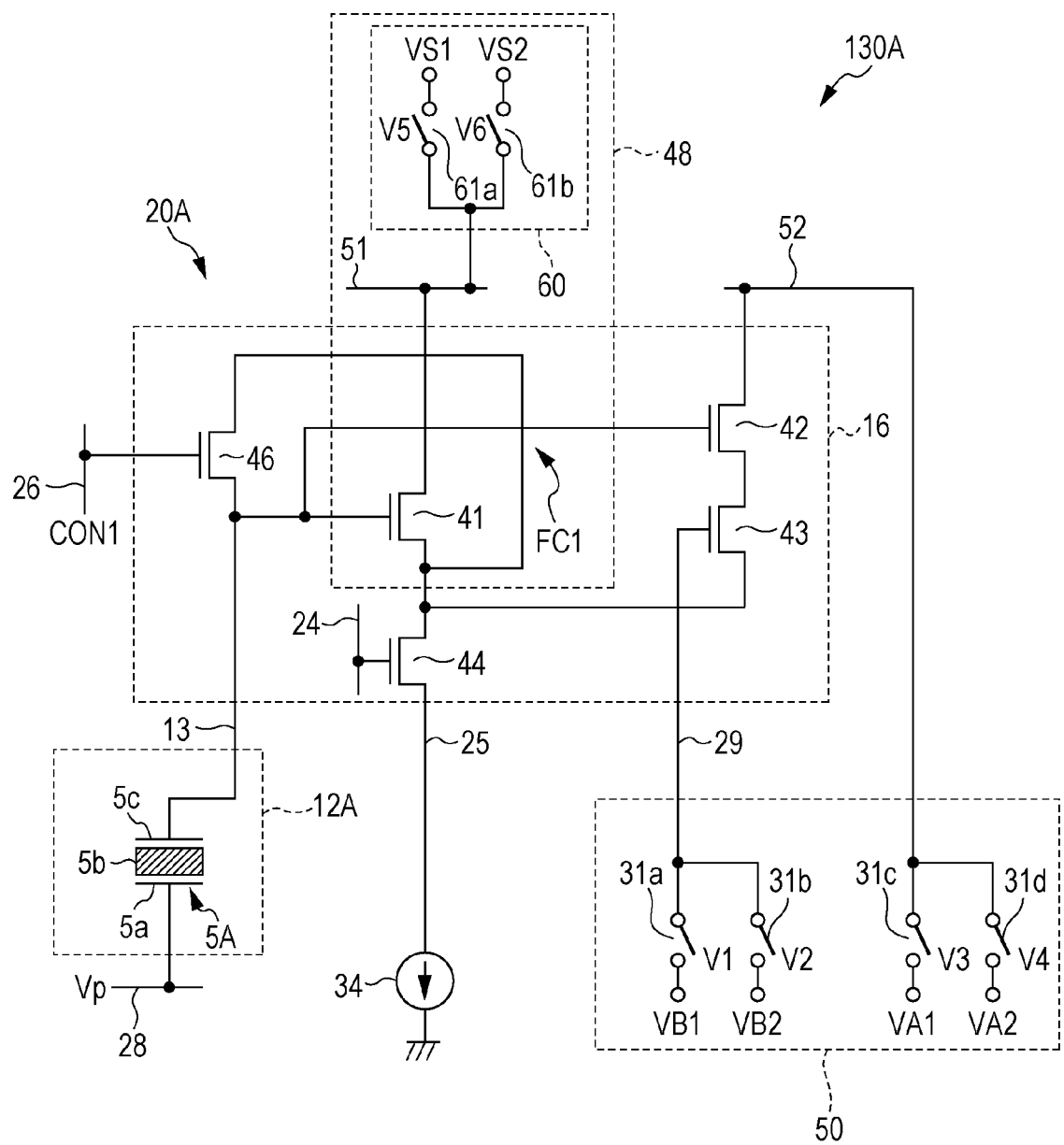
FIG. 13 is a diagram showing still another example of an imaging device according to the third embodiment of the present disclosure.

FIG. 13 shows still another example of an imaging device according to the third embodiment of the present disclosure. A point of difference between an imaging device 130A shown in FIG. 13 and the imaging device 120A described with reference to FIG. 10 is that the imaging device 130A includes a voltage supply circuit 50 instead of a voltage supply circuit 30. Such a configuration brings about an effect of further increasing the capacitance of the second transistor 42, which functions as a capacitor in the first mode, as with the second embodiment.

Operation in the imaging device 130A may be the same as the exemplary operation of the imaging device 120A described with reference to FIG. 11. Therefore, a description of operation of the imaging device 130A is omitted here.

Third Modification of the Third Embodiment

Figure 14:
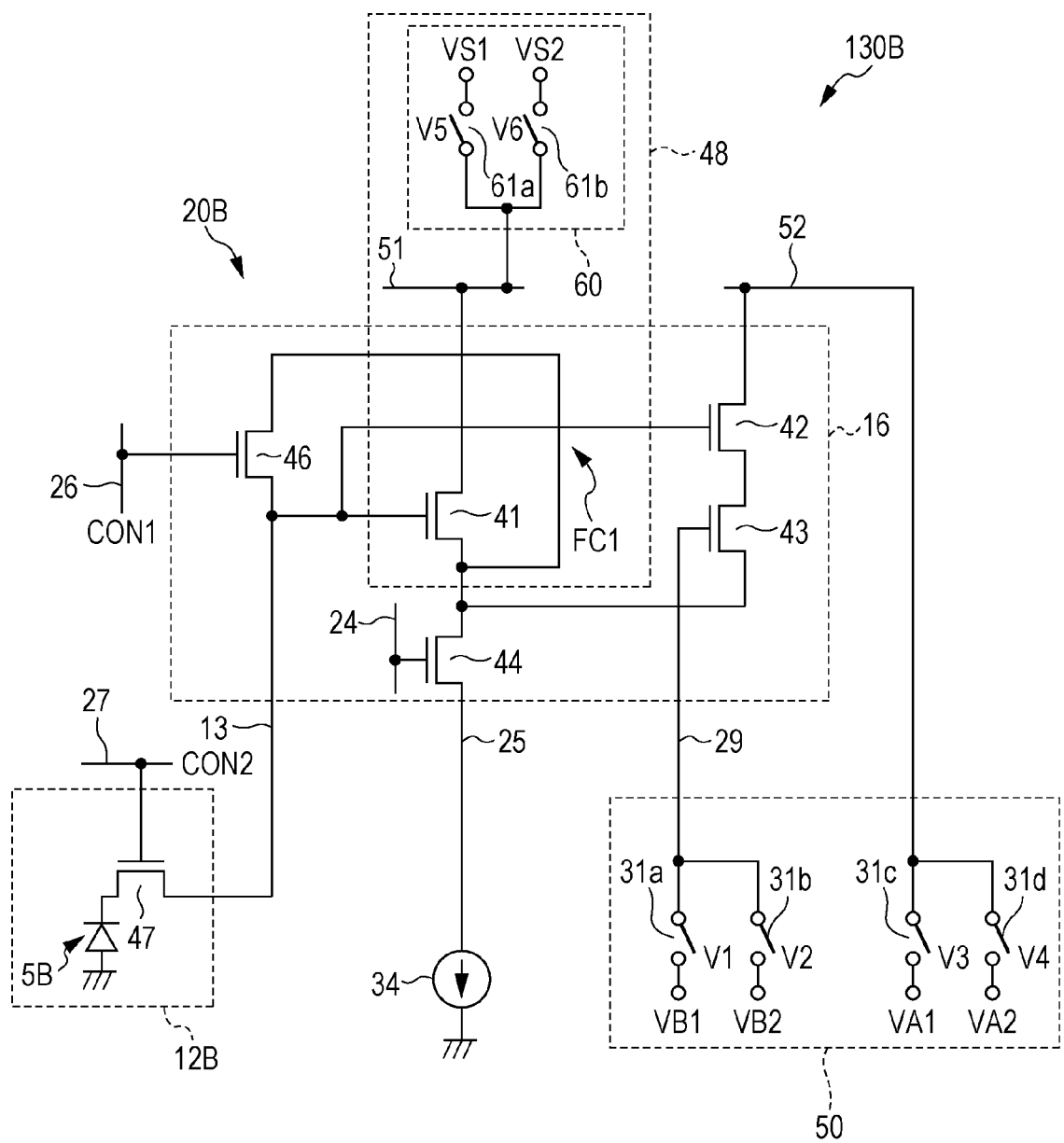
FIG. 14 is a diagram showing still another example of an imaging device according to the third embodiment of the present disclosure.

FIG. 14 shows still another example of an imaging device according to the third embodiment of the present disclosure. Whereas the aforementioned imaging device 130A includes a unit pixel cell 20A, an imaging device 130B shown in FIG. 14 includes a unit pixel cell 20B. An operation of signal readout in the imaging device 130B may be the same as that in the imaging device 120B shown in FIG. 12. Such a configuration also can bring about an effect of further increasing the capacitance of the second transistor 42, which functions as a capacitor in the first mode.

Fourth Embodiment

Figure 15:
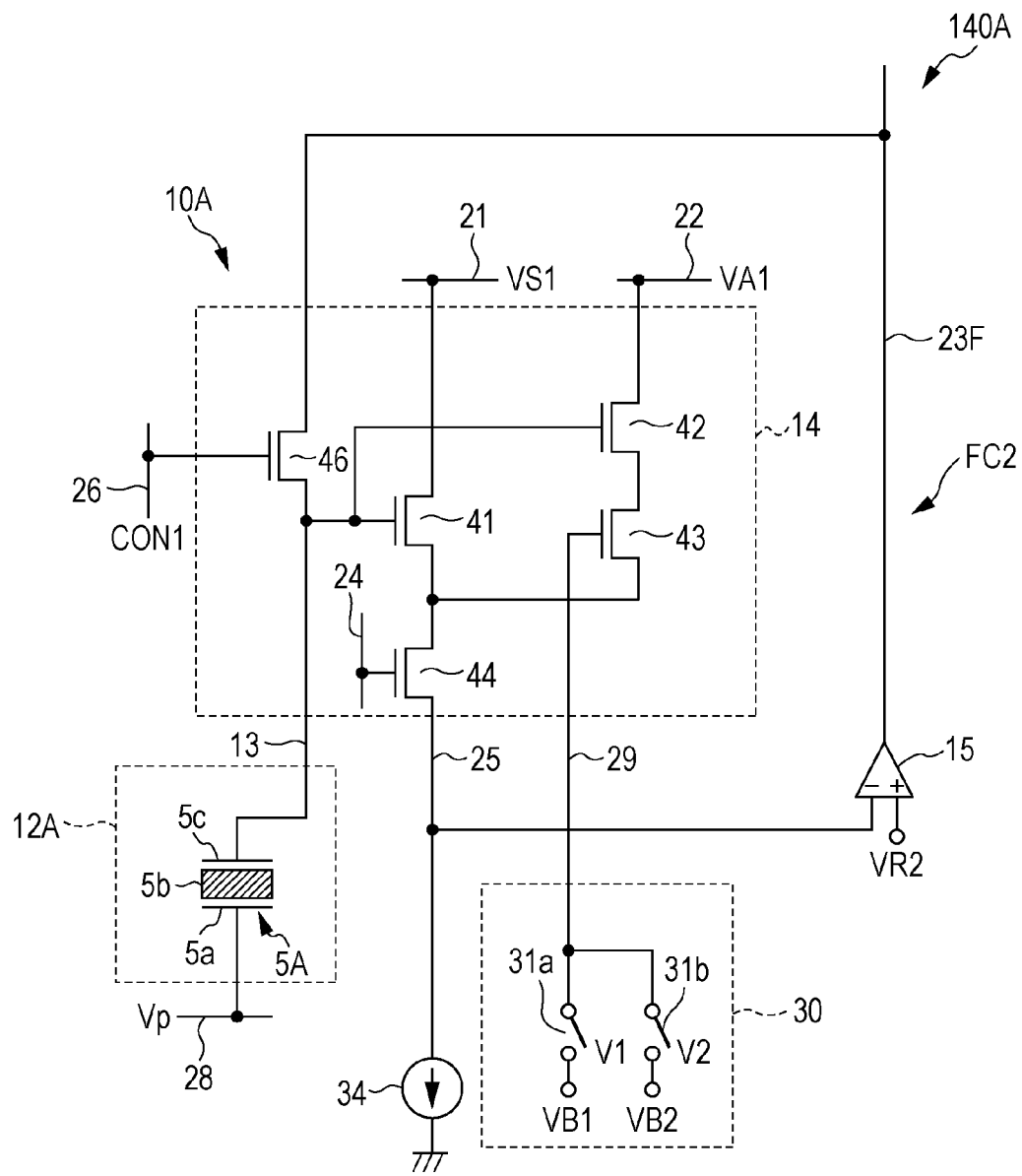
FIG. 15 is a diagram showing an exemplary circuit configuration of an imaging device according to a fourth embodiment of the present disclosure.

FIG. 15 is a diagram showing an exemplary circuit configuration of an imaging device according to a fourth embodiment of the present disclosure. An imaging device 140A shown in FIG. 15 includes the aforementioned photoelectric converter 12A, the aforementioned signal detection circuit 14, and the aforementioned voltage supply circuit 30. The imaging device 140A further includes a feedback circuit FC2 that negatively feeds back an output from the signal detection circuit 14.

In the configuration exemplified in FIG. 15, the imaging device 140A includes an inverting amplifier 15 as part of the peripheral circuit. The inverting amplifier 15 is provided for each column of the pixel array PA (see FIG. 1). As illustrated, each of the inverting amplifiers 15 has an inverting input terminal connected to a corresponding one of the output signal lines 25. Therefore, in the first mode, the inverting amplifier 15 receives an output from the first transistor 41 through the inverting input terminal, and in the second mode, the inverting amplifier 15 receives an output from the first transistor 41 and an output from the second transistor 42 through the inverting input terminal. Each of the inverting amplifiers 15 has an output terminal having an electrical connection with a unit pixel cell 10A having a connection with the inverting input terminal of that inverting amplifier 15. More specifically, the output terminal of the inverting amplifier 15 and that one of the source and drain of the reset transistor 46 in the unit pixel cell 10A which is not connected to the signal-detecting node 13 are connected to each other via a feedback line 23F provided for a corresponding column.

By controlling the potentials of the address signal line 24 and the reset control line 26 to bring the address transistor 44 and the reset transistor 46 to an on-state, a feedback loop that negatively feeds back an output from a selected unit pixel cell 10A can be formed. The formation of a feedback loop is executed on one of the unit pixel cells 10A that share the feedback line 23F. In this example, the inverting amplifier 15 is part of the feedback loop in the feedback circuit FC2. The inverting amplifier 15 may be called a feedback amplifier.

The inverting amplifier 15 has a non-inverting input terminal to which a predetermined voltage (e.g., 1 V or a positive voltage that is close to 1 V) VR2 is supplied. The voltage VR2 is a reference voltage in reset operation. As with the aforementioned voltage VR1, the voltage VR2 may, for example, be 1 V or a positive voltage that is close to 1 V.

Operation of the address transistor 44 and the reset transistor 46 in the imaging device 140A may be the same as the exemplary operation of the imaging device 120A described with reference to FIG. 11. Therefore, a detailed description of operation of the imaging device 140A is omitted here. In this example, when the address transistor 44 and the reset transistor 46 are on, the voltage of the signal-detecting node 13 is reset to such a voltage that the voltage of the output signal line 25 becomes equal to the reference voltage VR2. This makes it possible to eliminate, on a row-at-a-time basis, the influence of variation in threshold value among the first transistors 41 included in the pixel array PA.

First Modification of the Fourth Embodiment

Figure 16:
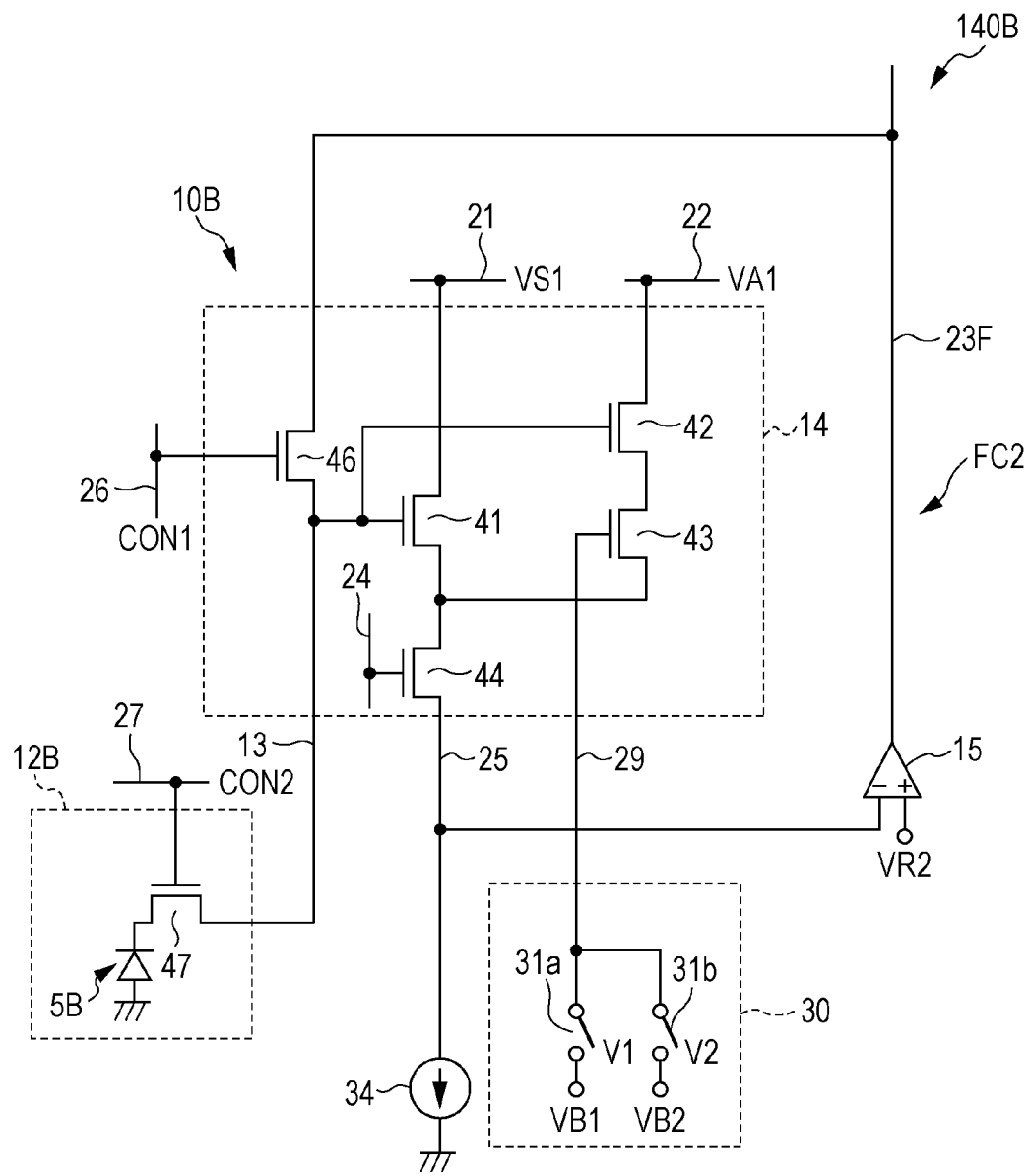
FIG. 16 is a diagram showing another example of an imaging device according to the fourth embodiment of the present disclosure.

FIG. 16 shows another example of an imaging device according to the fourth embodiment of the present disclosure. Whereas the imaging device 140A described with reference to FIG. 15 includes the unit pixel cell 10A, an imaging device 140B shown in FIG. 16 includes a unit pixel cell 10B. Such a configuration also makes it possible to reduce the influence of variation in threshold value among the first transistors 41, as with the aforementioned imaging device 140A. Operation in the imaging device 140B may be the same as the operation of the imaging device 140A shown in FIG. 15, except that signal charge generated by the photoelectric converter 12B is transferred to the floating diffusion. Therefore, a description of operation of the imaging device 140B is omitted here.

Second Modification of the Fourth Embodiment

Figure 17:
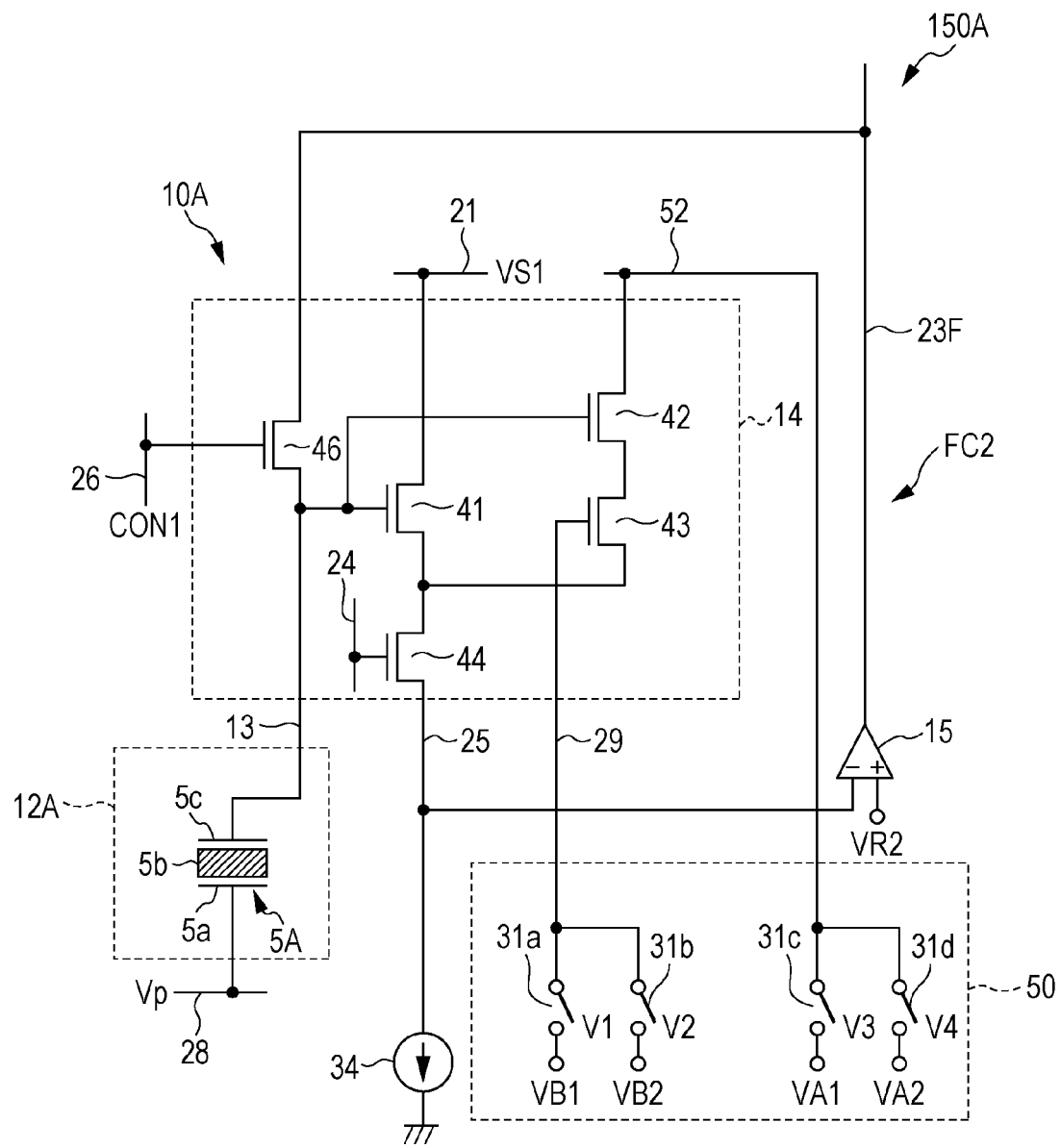
FIG. 17 is a diagram showing still another example of an imaging device according to the fourth embodiment of the present disclosure.

FIG. 17 shows still another example of an imaging device according to the fourth embodiment of the present disclosure. A point of difference between an imaging device 150A shown in FIG. 17 and the imaging device 140A described with reference to FIG. 15 is that the imaging device 150A includes a voltage supply circuit 50 instead of a voltage supply circuit 30. Such a configuration brings about the effect of further increasing the capacitance of the second transistor 42, which functions as a capacitor in the first mode, in addition to the effect of reducing the influence of variation in threshold value among the first transistors 41.

Third Modification of the Fourth Embodiment

Figure 18:
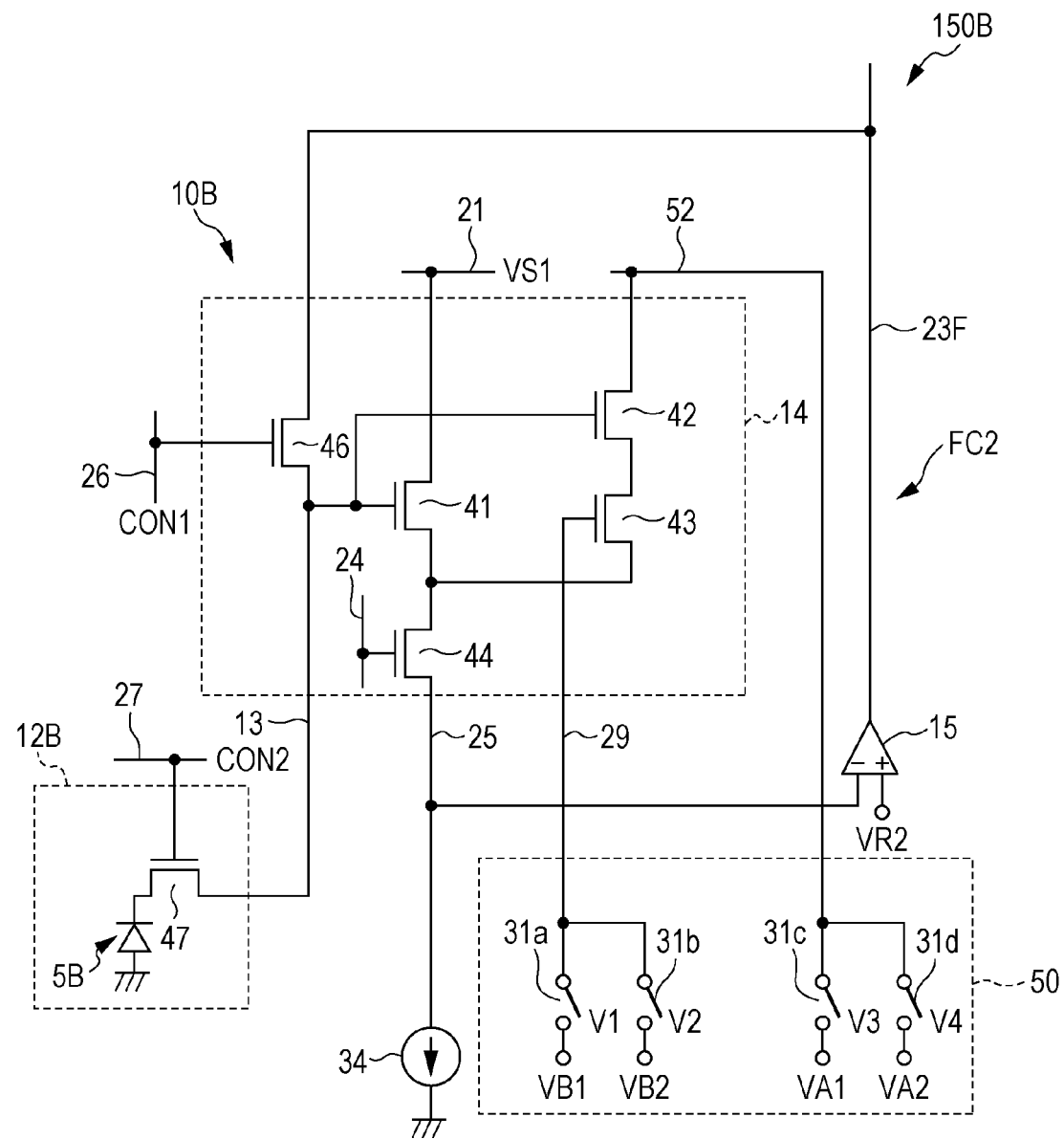
FIG. 18 is a diagram showing still another example of an imaging device according to the fourth embodiment of the present disclosure.

FIG. 18 shows still another example of an imaging device according to the fourth embodiment of the present disclosure. Whereas the aforementioned imaging device 150A includes the unit pixel cell 10A, an imaging device 150B shown in FIG. 18 includes a unit pixel cell 10B. Such a configuration also makes it possible to bring about the effect of reducing the influence of variation in threshold value among the first transistors 41 and the effect of further increasing the capacitance of the second transistor 42, which functions as a capacitor in the first mode.

Fifth Embodiment

Figure 19:
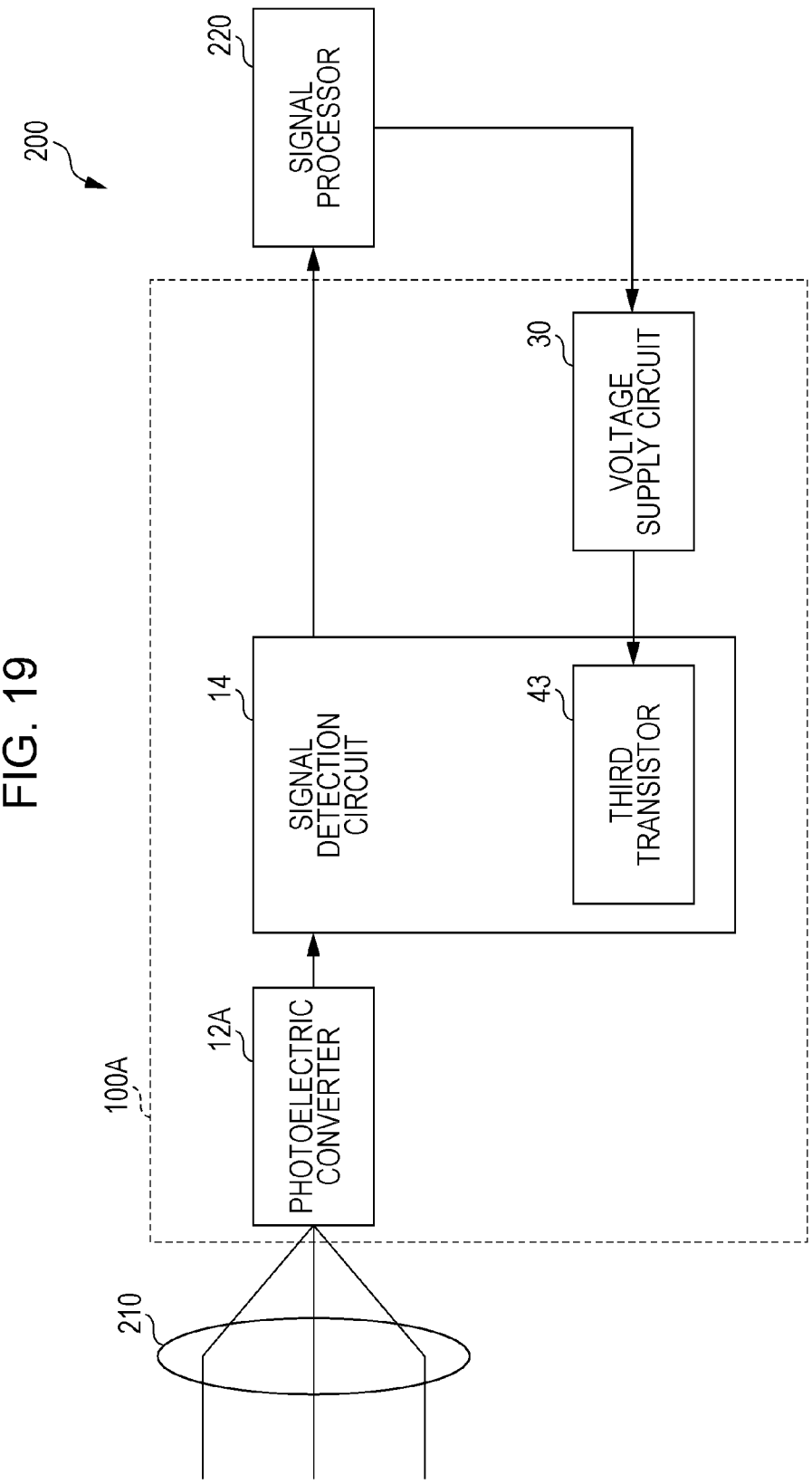
FIG. 19 is a diagram schematically showing an example of a camera system according to a fifth embodiment of the present disclosure.

FIG. 19 shows an example of a camera system according to a fifth embodiment of the present disclosure. A camera system 200 shown in FIG. 19 includes a lens optical system 210, an imaging device 100A described with reference to FIGS. 1 to 3, and a signal processor 220.

The lens optical system 210 includes, for example, an autofocus lens, a zoom lens, and a diaphragm. The lens optical system 210 focuses light onto an imaging area of the imaging device 100A.

The signal processor 220 includes, for example, a memory and a DSP (digital signal processor), and functions as a signal processing circuit that processes an output signal from the imaging device 100A. The signal processor 220 performs processing on data acquired by the imaging device 100A. Examples of the processing include gamma correction, color interpolation, spatial interpolation, and auto white balance. The signal processor 220 may be a processing circuit that is separate from a system controller that exercises overall control of the camera system 200 or may be part of the system controller. The system controller may be achieved, for example, by a microcomputer.

In this example, the control voltage V1 for switching on and off the first switch 31a in the voltage supply circuit 30 and the control voltage V2 for switching on and off the second switch 31b in the voltage supply circuit 30 are supplied from the signal processor 220. As will be described below, the signal processor 220 is configured to supply the voltage supply circuit 30 with a control signal corresponding to the luminance of a subject.

The signal processor 220 determines the luminance of a subject, for example, by detecting the luminance of the subject on the basis of a signal obtained by the imaging device 100A and comparing the luminance thus detected with a threshold value prepared in advance. The term "luminance of a subject" means the luminance of an object included in the scene to be taken a picture of or the brightness of the scene during picture taking. The luminance of the subject may, for example, be an output from that one of the pixels which exhibits the highest luminance value. In a case where the luminance thus detected is higher than the threshold value, the signal processor 220 determines that the subject is in a first luminance state. On the other hand, in a case where the luminance thus detected is equal to or lower than the threshold value, the signal processor 220 determines that the subject is in a second luminance state. The threshold value used for the determination is stored, for example, in a memory.

Having determined that the subject is in the first luminance state, the signal processor 220 uses the control voltages V1 and V2 to turn on the first switch 31a and turn off the second switch 31b. This causes the first voltage VB1 to be applied from the voltage supply circuit 30 to the gate of the third transistor 43, thereby causing the imaging device 100A to be set to the first mode. In the first mode, the imaging device 100A can operate in a wider dynamic range than in the second mode, as the second transistor 42 functions as a capacitor. This makes it possible to take a picture in a brighter environment.

Having determined that the subject is in the second luminance state, the signal processor 220 uses the control voltages V1 and V2 to turn off the first switch 31a and turn on the second switch 31b. This causes the second voltage VB2 to be applied from the voltage supply circuit 30 to the gate of the third transistor 43, thereby causing the imaging device 100A to be set to the second mode. In the second mode, high-speed signal readout is executed via the first transistor 41 and the second transistor 42.

Thus, in the embodiment of the present disclosure, the voltage supply circuit supplies either the first voltage VB1 or the second voltage VB2 to the gate of the third transistor 43 according to the luminance of a subject. For this reason, when the subject is in the first luminance state, the imaging device is set to the first mode, in which the dynamic range is wide, and when the subject is in the second luminance state, the imaging device is set to the second mode, in which high-speed signal readout is possible. This makes it possible to use the wide dynamic range and the high-speed signal readout properly depending on the purposes by switching the imaging device to the first mode or the second mode according to the scene to be taken a picture of.

The camera system 200 exemplified in FIG. 19 has the imaging device 100A. However, the same effects can be brought about by applying any of the aforementioned imaging devices 100B, 110A, 110B, 120A, 120B, 130A, 130B, 140A, 140B, 150A, and 150B instead of the imaging device 100A.

The camera system may include a sensor that detects the luminance of a subject. The signal processor 220 may be configured to determine the luminance of a subject according to an output from the sensor that detects the luminance of a subject.

Sixth Embodiment

Figure 20:
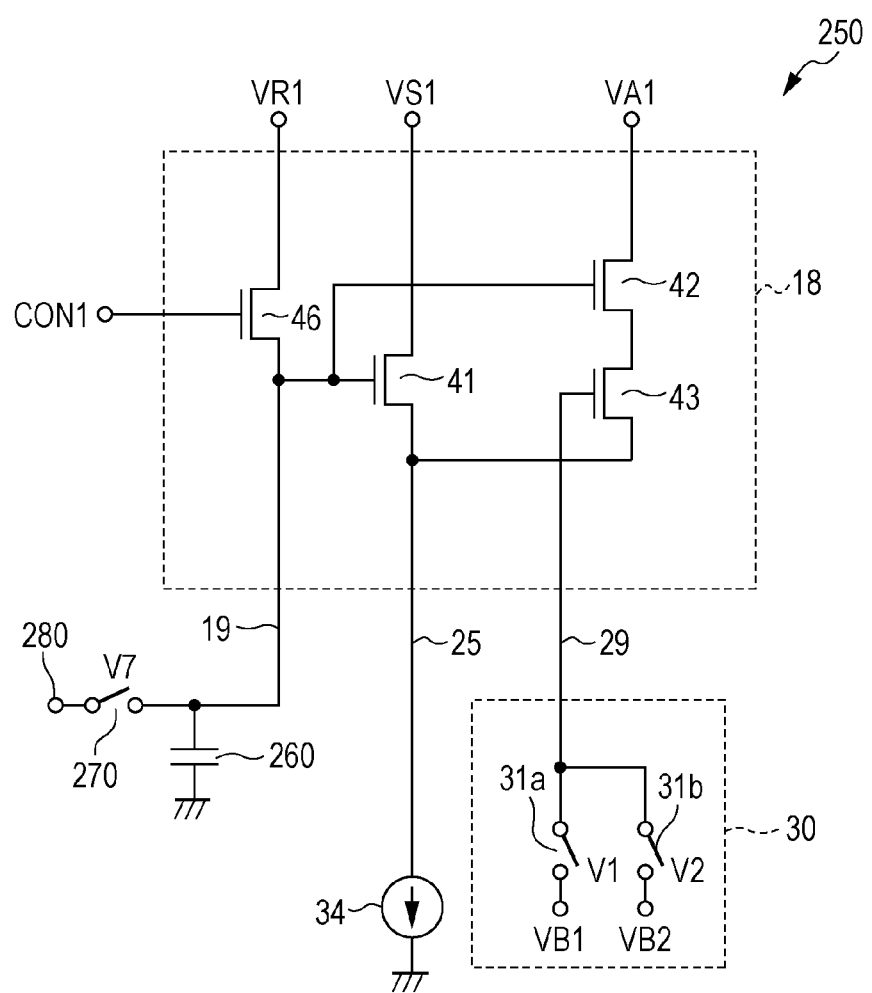
FIG. 20 is a diagram showing an example of a signal processing circuit according to a sixth embodiment of the present disclosure.

FIG. 20 shows an example of a signal processing circuit according to a sixth embodiment of the present disclosure. A signal processing circuit 250 shown in FIG. 20 includes a buffer 18 connected between an input (here, an input terminal 280) and an output (here, an output signal line 25) and a voltage supply circuit 30. The signal processing circuit 250 amplifies and/or filters an input signal.

The input terminal 280 of the signal processing circuit 250 is connected to a signal source. In the configuration exemplified in FIG. 20, a switch 270 (typically, an FET) is connected to a signal-detecting node 19 at which the input terminal 280 is connected to the buffer 18. Further, in the configuration exemplified in FIG. 20, a capacitive element 260 having one electrode at a fixed potential is connected between the switch 270 and the buffer 18. The turning on and turning off of the switch 270 is controlled by a control voltage V7 that is supplied, for example, from a control device (not illustrated).

The buffer 18 is the same in configuration as the aforementioned signal detection circuit 14, except that the buffer 18 does not include an address transistor. That is, the buffer 18 includes a first transistor 41, a second transistor 42, and a third transistor 43. As illustrated, the gate of the first transistor 41 is connected to the input terminal 280 via the signal-detecting node 19 and the switch 270, and one of the source or drain (here, the source) of the first transistor 41 is connected to the output signal line 25. As with the gate of the first transistor 41, the gate of the second transistor 42 is connected to the signal-detecting node 19. One of the source and drain (here, the drain) of the third transistor 43 is connected to one of the source or drain (here, the source) of the second transistor 42, and the other of the source and drain of the third transistor 43 is connected to the output signal line 25.

The voltage supply circuit 30 has an electrical connection with the gate of the third transistor 43. The voltage supply circuit 30 selectively supplies the first voltage VB1 or the second voltage VB2, which is higher than the first voltage VB1, to the gate of the third transistor 43. When the first voltage VB1 is supplied to the gate of the third transistor 43, the third transistor 43 is off, and the signal processing circuit 250 operates in the first mode, in which the second transistor 42 functions as a capacitor. On the other hand, when the second voltage VB2 is supplied to the gate of the third transistor 43, the third transistor 43 is on, and the signal processing circuit 250 operates in the second mode, in which the second transistor 42 functions as an amplification transistor.

During signal readout, first, the switch 270 is turned off after being turned on, and a signal voltage is obtained and held in the capacitive element 260. The buffer 18 outputs, to the output signal line 25, a signal corresponding to the voltage held in the capacitive element 260.

At this point in time, when the signal processing circuit 250 is in the first mode, signal readout is executed via the first transistor 41. In the first mode, in which the second transistor 42 functions as a capacitor, the capacitance of a node having a connection with the gate of the second transistor 42 is greater than it is in the second mode, in which the third transistor 43 is on. Therefore, the signal processing circuit 250 may be used as a filter circuit having a larger time constant. In the sixth embodiment, too, the second transistor 42, which functions as a capacitor, is connected to the signal-detecting node 19 without a p-n junction of a transistor. This makes it possible to read out a signal with a reduction in dark-current noise.

On the other hand, when the signal processing circuit 250 is in the second mode, signal readout is executed via the first transistor 41 and the second transistor 42. This allows the buffer 18 to have higher driving performance than it does in the first mode, thus making it possible to execute signal readout at a higher speed. After the signal readout, the voltage of the signal-detecting node 19 can be reset by turning on the reset transistor 46, whether in the first mode or the second mode.

Thus, the signal processing circuit 250 can switch between the first mode, in which it strongly exhibits a characteristic as a low-pass filter, and the second mode, in which it is capable of high-speed signal readout. The signal processing circuit 250 can be applied, for example, to an image sensor or a discrete analog filter of a transmitter-receiver. For example, in a case where the signal processing circuit 250 is applied to a two-dimensional image sensor, the signal processing circuit 250 may be connected for each column of the pixel array. The signal processing circuit 250 may be used as part of an amplification circuit.

As described above, embodiments of the present disclosure make it possible to expand a dynamic range while suppressing contamination of a floating diffusion by dark-current noise. Each of the aforementioned embodiments has described an example in which the first transistor 41, the second transistor 42, the third transistor 43, the address transistor 44, the reset transistor 46, and the transfer transistor 47 are all N-channel MOS transistors. However, the transistors according to the embodiments of the present disclosure are not limited to N-channel MOS transistors. The first transistor 41, the second transistor 42, the third transistor 43, the address transistor 44, the reset transistor 46, and the transfer transistor 47 may alternatively be P-channel MOS transistors. Further, all of these transistors do not need to be uniformly N-channel MOS transistors or P-channel MOS transistors. The transistors may be bipolar transistors, as well as FETs.

Embodiments of the present disclosure are useful as imaging devices such as optical sensors, image sensors, and cameras. Embodiments of the present disclosure are applicable, for example, to digital still cameras, digital video cameras, cell-phone cameras, on-board cameras, cameras for use in robots, or cameras for medical use such as electronic endoscopes.

What is claimed is:

1. An imaging device comprising:
   a photoelectric converter that generates signal charge;
   a charge storage node that stores the signal charge;
   a capacitive element connected to the charge storage node;
   a first transistor one of a source and a drain of which is connected to the charge storage node via the capacitive element, and
   a second transistor having a gate connected to the charge storage node, wherein
   the photoelectric converter is connected, without transistor intervention, to the gate of the second transistor and the capacitive element, and
   switching between on-state and off-state of the first transistor causes an amount of saturated charge in the charge storage node to be changed.

2. The imaging device according to claim 1, wherein the one of the source and the drain of the first transistor is connected to a power supply line to which a first voltage is applied.

3. The imaging device according to claim 1, further comprising voltage supply circuitry connected to the one of the source and the drain of the first transistor.

4. The imaging device according to claim 1, wherein the capacitive element includes a third transistor, a gate of the third transistor being connected to the charge storage node, one of a source and a drain of the third transistor being connected to the one of the source and the drain of the first transistor.

5. The imaging device according to claim 4, wherein the other of the source and the drain of the third transistor is connected to a power supply line to which a first voltage is applied.

6. The imaging device according to claim 4, further comprising voltage supply circuitry connected to the other of the source and the drain of the third transistor.

7. The imaging device according to claim 6, wherein the voltage supply circuitry selectively supplies a first voltage or a second voltage different from the first voltage to a gate of the first transistor.

8. The imaging device according to claim 1, further comprising voltage supply circuitry connected to a gate of the first transistor, wherein
   the voltage supply circuitry selectively supplies a first voltage or a second voltage to the gate of the first transistor, the first transistor being in on-state when the first voltage is supplied, the first transistor being in off-state when the second voltage is supplied.

9. An imaging device comprising:
   a photoelectric converter that generates signal charge;
   a charge storage node that stores the signal charge;
   a capacitive element connected to the charge storage node;
   a first transistor one of a source and a drain of which is connected to the charge storage node via the capacitive element, and
   a second transistor having a gate connected to the charge storage node, wherein
   the photoelectric converter is connected, without transistor intervention, to the gate of the second transistor and the capacitive element, and
   switching between on-state and off-state of the first transistor causes a capacitance value of the charge storage node to be changed.

10. The imaging device according to claim 9, wherein the one of the source and the drain of the first transistor is connected to a power supply line to which a first voltage is applied.

11. The imaging device according to claim 9, further comprising voltage supply circuitry connected to the one of the source and the drain of the first transistor.

12. The imaging device according to claim 9, wherein the capacitive element includes a third transistor, a gate of the third transistor being connected to the charge storage node, one of a source and a drain of the third transistor being connected to the one of the source and the drain of the first transistor.

13. The imaging device according to claim 12, wherein the other of the source and the drain of the third transistor is connected to a power supply line to which a first voltage is applied.

14. The imaging device according to claim 12, further comprising voltage supply circuitry connected to the other of the source and the drain of the third transistor.

15. The imaging device according to claim 14, wherein the voltage supply circuitry selectively supplies a first voltage or a second voltage different from the first voltage to a gate of the first transistor.

16. The imaging device according to claim 9, further comprising voltage supply circuitry connected to a gate of the first transistor, wherein
   the voltage supply circuitry selectively supplies a first voltage or a second voltage to the gate of the first transistor, the first transistor being in on-state when the first voltage is supplied, the first transistor being in off-state when the second voltage is supplied.

17. The imaging device according to claim 1, wherein
   the photoelectric converter includes a first electrode, a second electrode and a photoelectric conversion layer between the first electrode and the second electrode, and
   the first electrode is connected, without transistor intervention, to the gate of the second transistor and the capacitive element.

18. The imaging device according to claim 1, wherein switching between on-state and off-state of the first transistor causes a dynamic range to be changed.

19. The imaging device according to claim 1, wherein the charge storage node is a node among the photoelectric converter, the capacitive element and the gate of the second transistor.

20. An imaging device comprising:
   a photoelectric converter that generates signal charge;
   a charge storage node that stores the signal charge;
   a capacitive element connected to the charge storage node;
   a first transistor one of a source and a drain of which is connected to the charge storage node via the capacitive element, and
   a second transistor having a gate connected to the charge storage node, wherein
   the photoelectric converter is electrically connected to the gate of the second transistor and the capacitive element during an exposure period in which the photoelectric converter generates the signal charge, and
   switching between on-state and off-state of the first transistor causes an amount of saturated charge in the charge storage node to be changed.

21. The imaging device according to claim 20, wherein the photoelectric converter is electrically connected to the gate of the second transistor and the capacitive element during operation of the imaging device.

* * * * *